US010645198B2

(12) United States Patent
Hori et al.

(10) Patent No.: US 10,645,198 B2
(45) Date of Patent: May 5, 2020

(54) COMMUNICATION TERMINAL AND COMMUNICATION METHOD

(71) Applicant: PANASONIC INTELLECTUAL PROPERTY CORPORATION OF AMERICA, Torrance, CA (US)

(72) Inventors: Takako Hori, Kanagawa (JP); Hiroyuki Ehara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 142 days.

(21) Appl. No.: 15/187,030

(22) Filed: Jun. 20, 2016

(65) Prior Publication Data

US 2016/0301777 A1 Oct. 13, 2016

Related U.S. Application Data

(63) Continuation of application No. 13/880,806, filed as application No. PCT/JP2011/005986 on Oct. 26, 2011, now Pat. No. 9,401,975.

(30) Foreign Application Priority Data

Nov. 10, 2010 (JP) ................................. 2010-252113
Dec. 14, 2010 (JP) ................................. 2010-278222
(Continued)

(51) Int. Cl.
*H04J 3/16* (2006.01)
*H04L 29/06* (2006.01)
(Continued)

(52) U.S. Cl.
CPC .............. *H04L 69/08* (2013.01); *H04L 69/22* (2013.01); *H04L 69/24* (2013.01); *H04W 28/18* (2013.01);
(Continued)

(58) Field of Classification Search
CPC ....................................................... H04L 69/08
See application file for complete search history.

(56) References Cited

U.S. PATENT DOCUMENTS 6,512,924 B2   1/2003   Sawada et al.
6,671,367 B1  12/2003   Graf et al.
(Continued)

FOREIGN PATENT DOCUMENTS

EP    2 043 375 A1   4/2009
JP    11-113052      4/1999
(Continued)

OTHER PUBLICATIONS

S. Ahmadi, Real-Time Transport Protocol (RTP) Payload Format for the Variable-Rate Multimode Wideband (VMR-WB) Audio Codec, Jan. 2006, The Internet Society, 2006, pp. 1-32 (Year: 2006).*
(Continued)

*Primary Examiner* — Guang W Li
(74) *Attorney, Agent, or Firm* — Greenblum & Bernstein, P.L.C.

(57) ABSTRACT

A communication terminal and method are provided, wherein a processor executes instructions to configure a codec mode or a codec mode set for a communication terminal. The configuration is based on Session Description Protocol (SDP) offer/answer messages between the communication terminal and a partner terminal in a codec negotiation session when communication starts between the communication terminal and the partner terminal, when the SDP offer/answer messages include a codec, and when a codec mode or a codec mode set is included. The processor also configures a Real-time Transport Protocol (RTP) payload format header based on the SDP offer/answer messages in the codec negotiation session, a CMR being a request for the partner terminal to change the codec mode. The processor further causes the transmitter to transmit, after the codec (Continued)

negotiation session, a codec mode of the communication terminal currently in use, using an RTP payload.

11 Claims, 30 Drawing Sheets

(30) Foreign Application Priority Data

Apr. 6, 2011 (JP) .................................. 2011-084442
Aug. 9, 2011 (JP) .................................. 2011-173910

(51) Int. Cl.
| | |
|---|---|
| H04W 76/10 | (2018.01) |
| H04W 28/18 | (2009.01) |
| H04W 76/12 | (2018.01) |
| H04W 36/00 | (2009.01) |
| H04W 88/18 | (2009.01) |
| H04W 84/04 | (2009.01) |

(52) U.S. Cl.
CPC ..... *H04W 36/00837* (2018.08); *H04W 76/10* (2018.02); *H04W 76/12* (2018.02); *H04W 84/045* (2013.01); *H04W 88/181* (2013.01)

(56) References Cited

U.S. PATENT DOCUMENTS

| | | | |
|---|---|---|---|
| 9,401,975 B2* | 7/2016 | Hori ...................... | H04W 28/18 |
| 2001/0041981 A1* | 11/2001 | Ekudden ............... | H03M 13/35 704/270.1 |
| 2004/0101125 A1 | 5/2004 | Graf et al. | |
| 2005/0141456 A1 | 6/2005 | Shaheen | |
| 2005/0213546 A1 | 9/2005 | Reitter et al. | |
| 2006/0077994 A1 | 4/2006 | Spindola et al. | |
| 2006/0159037 A1 | 7/2006 | Jabri et al. | |
| 2007/0073898 A1 | 3/2007 | Shen | |
| 2008/0077410 A1* | 3/2008 | Ojala ..................... | G10L 19/167 704/500 |
| 2008/0117906 A1* | 5/2008 | Xie ........................ | H04L 65/608 370/392 |
| 2009/0076802 A1 | 3/2009 | Witzel et al. | |
| 2009/0290573 A1 | 11/2009 | Belling et al. | |
| 2010/0220717 A1* | 9/2010 | Kim .................. | H04L 29/06027 370/352 |
| 2011/0103278 A1* | 5/2011 | Ozawa ................ | H04L 12/6418 370/310 |
| 2011/0170410 A1* | 7/2011 | Zhao ....................... | H04L 47/10 370/232 |
| 2011/0171953 A1 | 7/2011 | Faccin et al. | |
| 2012/0014275 A1 | 1/2012 | Koo et al. | |
| 2012/0028642 A1 | 2/2012 | Schliwa-Bertling | |
| 2012/0035918 A1* | 2/2012 | Frankkila ............. | G10L 19/167 704/201 |
| 2012/0106451 A1* | 5/2012 | Enstrom ............ | H04W 36/385 370/328 |
| 2012/0120813 A1* | 5/2012 | Johansson ............... | G10L 19/22 370/249 |
| 2012/0185600 A1 | 7/2012 | Belling et al. | |
| 2013/0242741 A1* | 9/2013 | Ozawa .................. | H04M 3/367 370/235 |
| 2013/0310959 A1* | 11/2013 | Sandu ..................... | G10L 25/60 700/94 |

FOREIGN PATENT DOCUMENTS

| | | |
|---|---|---|
| JP | 2003-500907 | 1/2003 |
| JP | 2005-175694 | 6/2005 |
| JP | 2005-531949 | 10/2005 |
| JP | 2006-121361 | 5/2006 |
| JP | 2007-097165 | 4/2007 |
| JP | 2008-086020 | 4/2008 |
| JP | 2008-311858 | 12/2008 |
| JP | 2009-512379 | 3/2009 |
| JP | 2009-528732 | 8/2009 |
| WO | WO 02/15627 | 2/2002 |
| WO | 2010/007977 | 1/2010 |
| WO | 2010/079967 | 7/2010 |

OTHER PUBLICATIONS

J. Sjoberg, "Request for Comments 3267" for "Real-Time Transport Protocol (RTP) Payload Format and File Storage Format for the Adaptive Multi-Rate (AMR) and Adaptive Multi-Rate Wideband (AMR-WB) Audio Codecs"; Jun. 2002, see pp. 5-37.
"3rd Generation Partnership Project; Technical Specification Group Services and System Aspects; Architecture aspects of Home NodeB and Home eNodeB", 3GPP TR 23.830 V9.0.0, Sep. 2009.
"Universal Mobile Telecommunications Systems (UMTS); UTRAN overall description", (3GPP TS 25.401 V9.0.0 Release 9), Jan. 2010.
"3rd Generation Partnership Project; Technical Specification Group Core Network and Terminals; IP multimedia call control protocol based on Session Initiation Protocol (SIP) and Session Description Protocol (SDP); Stage 3 (Release 10)", 3GPP TS 24.229 V10.0.0, Jun. 2010.
"3rd Generation Partnership Project; Technical Specification Group Services and System Aspects; Network architecture (Release 10)", 3GPP TS 23.002 V10.0.0, Sep. 2010.
"Source-Controlled Variable-Rate Multimode Wideband Speech Codec (VMR-WB), Service Option 62 and 63 for Spread Spectrum Systems", 3GPP2 C. S0052-A Version 1.0, Apr. 22, 2005.
"Digital cellular telecommunications system Phase 2+); Universal Mobile Telecommunications System (UMTS; LTE; Single Radio Voice Call Continuity (SRVCC); Stage 2", 3GPP TS 23.216 V9.6.0, Release 9, Jan. 2011.
"LTE: Evolved Universal Terrestrial Radio Access (E-UTRA); Radio resource Control (RRC); Protocol specification", (3GPP TS 36.331 V10.0.0, Release 10), Jan. 2011.
"3rd Generation Partnership Project; Technical Specification Group Services and System Aspects; IP Multimedia Subsystem (IMS); Stage 2 (Release 10)", 3GPP TS 23.228 V10.3.1, Jan. 2011.
"3rd Generation Partnership Project; Technical Specification Group Core Network and Terminals; Numbering, addressing and identification (Release 10)", 3GPP TS 23.003 V10.0.0, Dec. 2010.
"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.2.1, Jan. 2011.
"3rd Generation Partnership Project; Technical Specification Group Services and System Aspects; Feasibility Study on Support for 3GPP Voice Interworking with Enterprise IP-PBX (VINE) (Release 11)", 3GPP TR 22.809 V1.0.0, Dec. 2010.
"3rd Generation Partnership Project: Technical Specification Group Services and System Aspects; Architecture enhancements for non-3GPP accesses (Release 10)", 3GPP TS 23.402 V10.2.1, Jan. 2011.
"RTP Payload Format and File Storage Format for the Adaptive Multi-Rate (AMR) and Adaptive Multi-Rate Wideband (AMR-WB) Audio Codecs", IETF RFC 4867, Apr. 2007.
"3rd Generation Partnership Project; Technical Specification Group Services and System Aspects; IP Multimedia Subsystem (IMS); Multimedia Telephony; Media handling and interaction (Release 9)", 3GPP TS 26.114 V9.3.0., Jun. 2010.
"3rd Generation Partnership Project; Technical Specification Group Services and System Aspects; Speech codec speech processing functions; Adaptive Multi-Rate-Wibeband (AMR-WB) speech codec; Frame structure (Release 9)", 3GPP TS 26.201 V9.0.0., Dec. 2009.
"3rd Generation Partnership Project; Technical Specification Group Services and System Aspects; Mandatory speech codec speech processing functions; Adaptive Multi-Rate (AMR) speech codec frame structure (Release 9)", 3GPP TS 26.101 V9.0.0., Dec. 2009.
International Search Report, dated Feb. 14, 2012, for International Application No. PCT/JP2011/005986.

(56) References Cited

OTHER PUBLICATIONS

Extended European Search Report, dated Oct. 27, 2017 from the European Patent Office (EPO), for the corresponding European Patent Application No. 11840382.3.

* cited by examiner

| SDP offer |
|---|
| m=audio 49152 RTP/AVP 97 98 99 100 |
| a=tcap:1 RTP/AVPF |
| a=pcfg:1 t=1 |
| a=rtpmap:97 AMR-WB/16000/1 |
| a=fmtp:97 mode-change-capability=2; max-red=220 |
| a=rtpmap:98 AMR-WB/16000/1 |
| a=fmtp:98 mode-change-capability=2; max-red=220; octet-align=1 |
| a=rtpmap:99 AMR/8000/1 |
| a=fmtp:99 mode-change-capability=2; max-red=220 |
| a=rtpmap:100 AMR/8000/1 |
| a=fmtp:100 mode-change-capability=2; max-red=220; octet-align=1 |
| a=ptime:20 |
| a=maxptime:240 |

| SDP answer |
|---|
| m=audio 49152 RTP/AVPF 97 |
| a=acfg:1 t=1 |
| a=rtpmap:97 AMR/8000/1 |
| a=fmtp:97 mode-change-capability=2; max-red=200 |
| a=ptime:40 |
| a=maxptime:240 |

FIG. 3

```
SDP offer
m=audio 49152 RTP/AVP 97 98 99 . . . .
a=tcap:1 RTP/AVPF
 . . .
a=rtpmap:97 SCHEME 1/. . .
a=fmtp:97 0x00 . . .
a=rtpmap:98 SCHEME 1/. . .
a=fmtp:98 0x01 . . .
a=rtpmap:99 SCHEME 1/. . .
a=fmtp:99 0x02 . . . .
 . . .
a=csg: Alice-femto
```

FIG. 8

| NUMBER | MEANING | CODEC MODE SET |
|---|---|---|
| 0x00 | NORMAL COMMUNICATION | BIT RATE: APPROX. 6 kbps, APPROX. 8 kbps, APPROX. 12 kbps<br>ALGORITHMIC DELAY: LOW |
| 0x01 | HeNB+<br>IP CORE NETWORK COMMUNICATION | BIT RATE: APPROX. 6 kbps, APPROX. 8 kbps, APPROX. 12 kbps, APPROX. 24 kbps<br>ALGORITHMIC DELAY: LOW |
| 0x02 | HeNB+<br>LOCAL NETWORK COMMUNICATION | BIT RATE: APPROX. 6 kbps, APPROX. 8 kbps, APPROX. 12 kbps, APPROX. 24 kbps<br>ALGORITHMIC DELAY: HIGH |

FIG. 9

| SDP answer |
|---|
| m=audio 49152 RTP/AVPF 98
a=acfg:1 t=1
.
.
a=rtpmap:98 SCHEME 1/. . .
a=fmtp:98 0x01 . . . .
.
.
a=csg: Bob-femto |

FIG. 11

| SDP offer |
|---|
| m=audio 49152 RTP/AVP 97 98 99 100 . . . .<br>a=tcap:1 RTP/AVPF<br>. . . .<br>a=rtpmap:97 SCHEME 1/. . .<br>a=fmtp:97 0x00 . . . .<br>a=rtpmap:98 SCHEME 1/. . .<br>a=fmtp:98 0x01 . . . .<br>a=rtpmap:99 SCHEME 1/. . .<br>a=fmtp:99 0x02 . . . .<br>a=rtpmap:100 SCHEME 1/. . .<br>a=fmtp:100 0x03 . . . .<br>. .<br>a=csg: Panasonic-femto<br>a=handover: low |

FIG. 14

| NUMBER | MEANING | CODEC MODE SET |
|---|---|---|
| 0x00 | NORMAL COMMUNICATION | BIT RATE: APPROX. 6 kbps, APPROX. 8 kbps, APPROX. 12 kbps<br>ALGORITHMIC DELAY: LOW |
| 0x01 | HeNB+<br>IP CORE NETWORK COMMUNICATION | BIT RATE: APPROX. 6 kbps, APPROX. 8 kbps, APPROX. 12 kbps, APPROX. 24 kbps<br>ALGORITHMIC DELAY: LOW |
| 0x02 | HeNB+<br>LOCAL NETWORK COMMUNICATION | BIT RATE: APPROX. 6 kbps, APPROX. 8 kbps, APPROX. 12 kbps, APPROX. 24 kbps<br>ALGORITHMIC DELAY: HIGH |
| 0x03 | TELEPHONE CONFERENCE COMMUNICATION | BIT RATE: APPROX. 100 kbps<br>ALGORITHMIC DELAY: HIGH |

FIG. 15

| SDP answer |
| --- |
| m=audio 49152 RTP/AVPF 100<br>a=acfg:1 t=1<br>. . .<br>a=rtpmap:100 SCHEME 1/. .<br>a=fmtp:100 0x03 . . .<br>. . .<br>a=csg: Panasonic-femto<br>a=handover: low |

FIG. 17

| Frame Type Index | CODEC | BASIC PART (kbps) | FIRST EXPANDED PART (kbps) | SECOND EXPANDED PART (kbps) |
|---|---|---|---|---|
| 0 | MULTIRATE | 12 | | |
| 1 | MULTIRATE | 24 | | |
| 2 | SCALABLE | 8 | | |
| 3 | SCALABLE | 12 | | |
| 4 | SCALABLE | 24 | | |
| 5 | SCALABLE | 8 | 4 | |
| 6 | SCALABLE | 12 | 4 | |
| 7 | SCALABLE | 24 | 4 | |
| 8 | SCALABLE | 8 | 12 | |
| 9 | SCALABLE | 12 | 12 | |
| 10 | SCALABLE | 24 | 12 | |
| 11 | SCALABLE | 8 | 4 | 8 |
| 12 | SCALABLE | 12 | 4 | 8 |
| 13 | SCALABLE | 24 | 4 | 8 |
| 14 | SCALABLE | 8 | 12 | 8 |
| 15 | SCALABLE | 12 | 12 | 8 |
| 16 | SCALABLE | 24 | 12 | 8 |
| 17 | | speech lost | | |
| 18 | | no data | | |
| 19~31 | | future use | | |

FIG. 19A

| Frame Type Index | Q BIT | DATA (1 FRAME) |
|---|---|---|

FIG. 19B

| Frame Type Index | Bit Rate (kbps) |
|---|---|
| 0 | 8 |
| 1 | 12 |
| 2 | 16 |
| 3 | 20 |
| 4 | 24 |
| 5 | 28 |
| 6 | 32 |
| 7 | 36 |
| 8 | 44 |
| 9 | speech lost |
| 10 | no data |
| 11-15 | future use |

FIG. 20A

| Codec Mode Request | R BIT | Frame Type Index | Q BIT | DATA (1 FRAME) |
|---|---|---|---|---|

FIG. 20B

| Frame Type Index | CODEC | Bit Rate (kbps) |
|---|---|---|
| 0 | MULTIRATE | 12 |
| 1 | MULTIRATE | 24 |
| 2 | SCALABLE BASIC PART | 8 |
| 3 | SCALABLE BASIC PART | 12 |
| 4 | SCALABLE BASIC PART | 24 |
| 5 | SCALABLE FIRST EXPANDED PART | 4 |
| 6 | SCALABLE FIRST EXPANDED PART | 12 |
| 7 | SCALABLE SECOND EXPANDED PART | 8 |
| 8 | | speech lost |
| 9 | | no data |
| 10-15 | | future use |

FIG. 21A

| Frame Type Index | C BIT | DATA BASIC PART (1 FRAME) |
|---|---|---|

| Frame Type Index | C BIT | EXPANDED PART (1 FRAME) |
|---|---|---|

| Frame Type Index | Bit Rate (GROSS BIT RATE, kbps) |
|---|---|
| 0 | 7.2 |
| 1 | 8 |
| 2 | 9.6 |
| 3 | 13.2 |
| 4 | 16.4 |
| 5 | 24.4 |
| 6 | speech lost |
| 7 | no data |
| 8-15 | future use |

FIG. 22B

| Frame Type Index | Q BIT | DATA (1 FRAME) |

FIG. 22C

| Frame Type Index | Q BIT | Codec Mode Request | DATA (1 FRAME) |

FIG. 23A

| Frame Type Index | Bit Rate (LENGTH OF DATA PORTION OF RTP PAYLOAD PER SEC, kbps) |
|---|---|
| 0 | 6.95 |
| 1 | 7.75 |
| 2 | 9.35 |
| 3 | 12.8 |
| 4 | 16 |
| 5 | 24 |
| 6 | speech lost |
| 7 | no data |
| 8-15 | future use |

FIG. 23B

| Frame Type Index (4 BITS) | Q BIT (1 BIT) | DATA (1 FRAME) |

FIG. 23C

| Frame Type Index (4 BITS) | Q BIT (1 BIT) | Codec Mode Request (3 BITS) | DATA (1 FRAME) |

```
SDP offer
m=audio 49152 RTP/AVP 97 98 99 100 101...
a=tcap:1 RTP/AVPF
...
a=rtpmap:97 SCHEME1-SWB/32000/...
a=fmtp:97 <bitrate={12,24}>; <VBR YES>;...
a=rtpmap:98 SCHEME1-SWB/32000/...
a=fmtp:98 <bitrate={12,24}>; <VBR NO>;...
a=rtpmap:99 SCHEME1-WB/16000/...
a=fmtp:99 <bitrate={12,24}>; <VBR YES>;...
a=rtpmap:100 SCHEME1-WB/16000/...
a=fmtp:100 <bitrate={12,24}>; <VBR NO>;...
a=rtpmap:101 SCHEME2-NB/8000/...
a=fmtp:101 <bitrate={8,12}>; <VBR NO>;...
...
```

FIG. 24B

```
<POLICY OF OPERATOR A>
PREFERENTIAL CODEC: SCHEME 1       ⎫
PREFERENTIAL AUDIO BAND: SWB        ⎬ POLICY A1
PREFERENTIAL BIT RATE: {12, 24} kbps⎪
VBR: ENABLED                       ⎭

PREFERENTIAL CODEC: SCHEME 1       ⎫
PREFERENTIAL AUDIO BAND: WB         ⎬ POLICY A2
PREFERENTIAL BIT RATE: {12, 24} kbps⎪
VBR: ENABLED                       ⎭

PREFERENTIAL CODEC: SCHEME 2       ⎫
PREFERENTIAL AUDIO BAND: NB         ⎬ POLICY A3
PREFERENTIAL BIT RATE: {8, 12} kbps ⎪
VBR: DISABLED                      ⎭
...
```

POLICY B1 {
  <POLICY OF OPERATOR B>
  PREFERENTIAL CODEC: SCHEME 1
  PREFERENTIAL AUDIO BAND: WB
  PREFERENTIAL BIT RATE: 12 kbps
  VBR: DISABLED
}

POLICY B2 {
  PREFERENTIAL CODEC: SCHEME 2
  PREFERENTIAL AUDIO BAND: NB
  PREFERENTIAL BIT RATE: 12 kbps
  VBR: DISABLED
  ...
}

FIG. 25B

SDP answer m=audio 49152 RTP/AVP 97
a=tcap:1 RTP/AVPF
...
a=rtpmap:97 SCHEME1 -WB/16000/ . . . .
a=fmtp:97 <bitrate={12}>; <VBR NO> ; . . . .
...

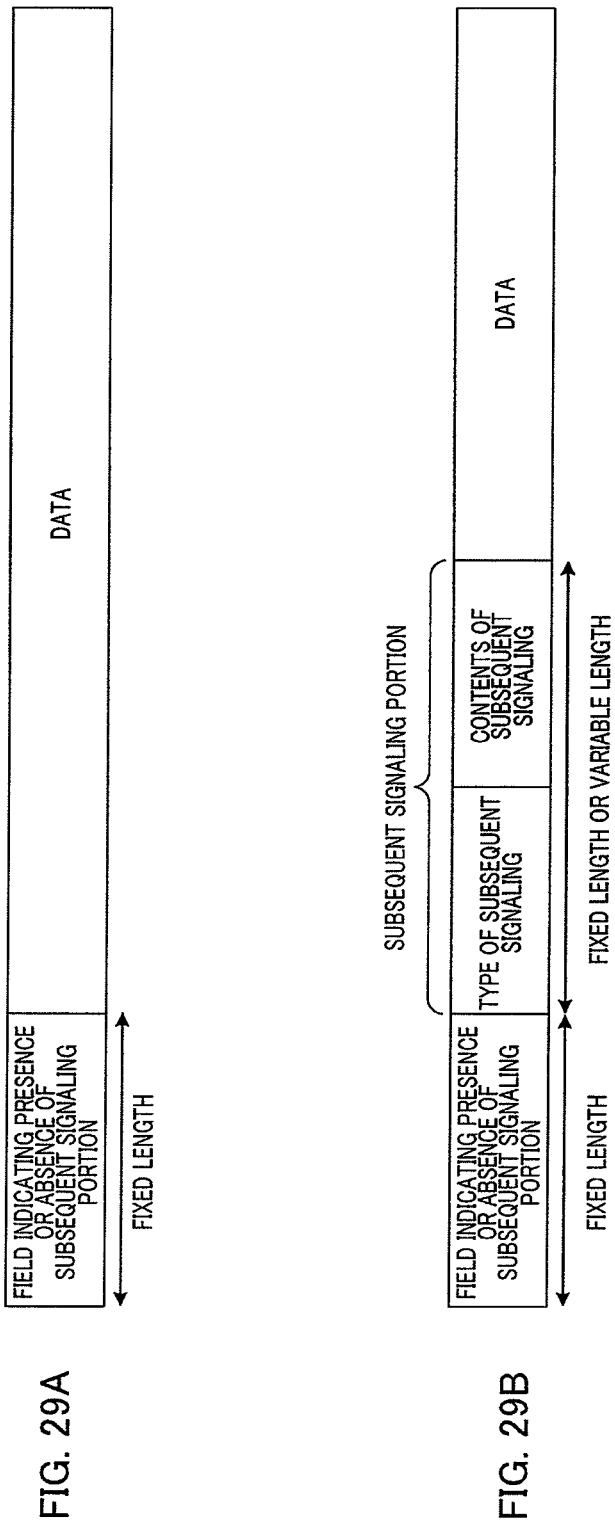

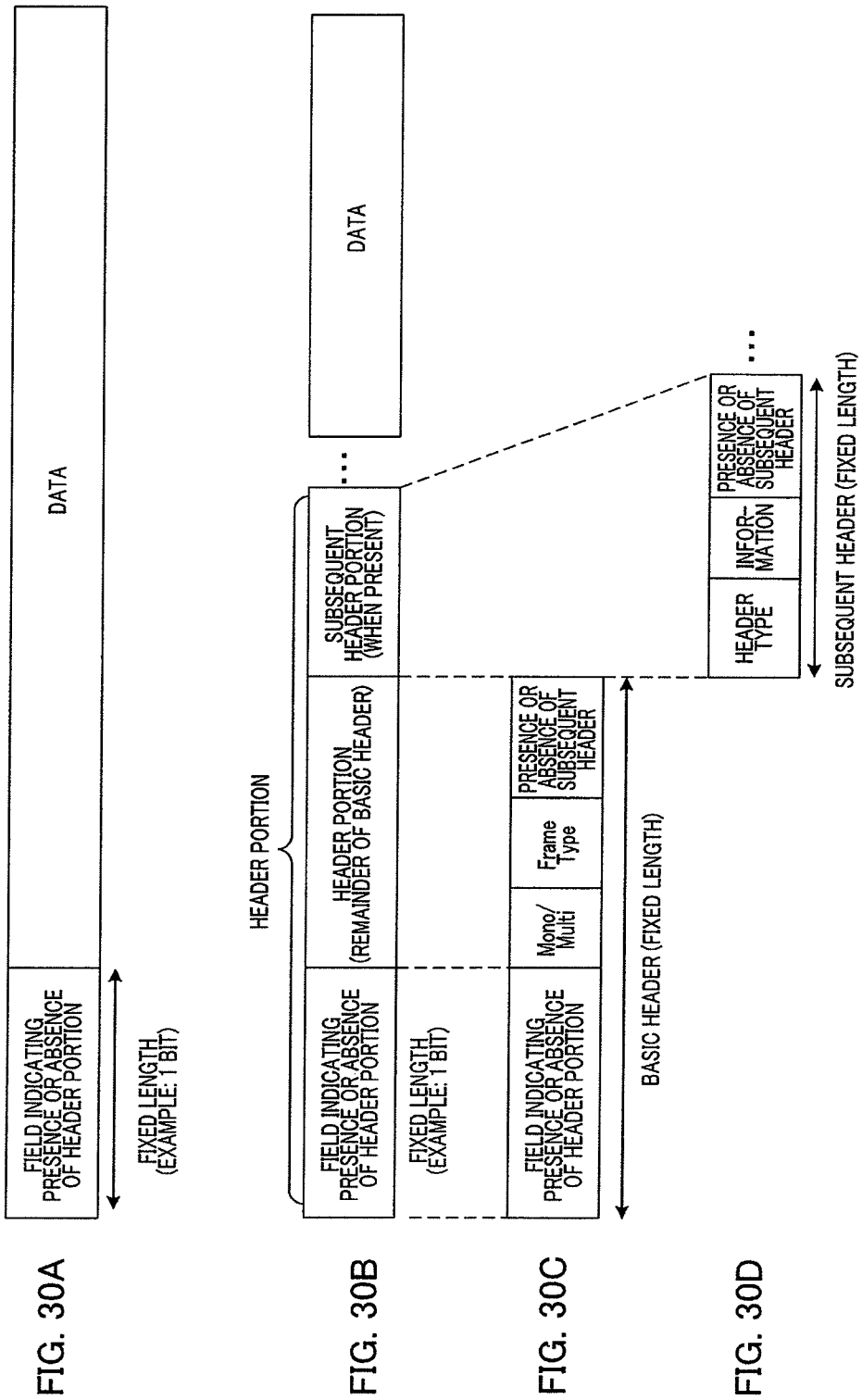

COMMUNICATION TERMINAL AND COMMUNICATION METHOD

CROSS-REFERENCE TO RELATED APPLICATION

This is a continuation application of pending U.S. patent application Ser. No. 13/880,806, filed Apr. 22, 2013, which is a National Stage Application of International Patent Application No. PCT/JP2011/005986 filed Oct. 26, 2011, which claims priority to Japanese Application Nos. 2010-252113, filed Nov. 10, 2010; 2010-278222, filed Dec. 14, 2010; 2011-84442, filed Apr. 6, 2011 and 2011-173910, filed Aug. 9, 2011. The disclosures of these documents, including the specifications, drawings and claims, are incorporated herein by reference in their entirety.

TECHNICAL FIELD

The present invention relates to a terminal and a codec mode selection method for selecting a suitable codec mode using characteristics of a wireless access network to which the terminal is connected.

BACKGROUND ART

In 3GPP (Third Generation Partnership Project), a VoIP (Voice over IP) service is underway using an IMS (IP Multimedia Subsytem).

FIG. 1 shows an example of network configurations of a VoIP service using a 3GPP IMS. The network shown in FIG. 1 is constructed of IMS network 126, an operator's IP core network 124, a base station (eNB: e Node B) and wireless access networks 120 and 122 configured under the control of the eNB. In FIG. 1, terminals (UE: User Equipment) 100 and 102 are wirelessly connected to eNBs 104 and 106 via wireless access networks 120 and 122 respectively, and are connected to IP core network 124 via eNBs 104 and 106 respectively.

The IMS network is a network intended to perform information management for call control, routing of a signaling message (SIP: Session Initiation Protocol) of call control, and mutual connections among 3GPP legacy networks or networks other than 3GPP.

In IMS network 126 shown in FIG. 1, P-CSCFs (Proxy Call Session Control Functions) 108 and 116 are CSCFs that have contact with UEs 100 and 102. When transmitting an IMS signaling message (SIP REGISTER message, SIP INVITE message or the like), the UE searches for a P-CSCF to which the UE can be connected and transmits the IMS signaling message to this P-CSCF.

S-CSCFs (serving CSCFs) 110 and 114 are CSCFs that manage UE contact information and manage sessions. S-CSCFs 110 and 114 download necessary information from HSS (Home Subscriber Server) 118 when managing the UE contact information.

I-CSCF (Interrogating CSCF) 112 holds CSCF information between management domains (each of which is a network unit managed by each operator). For example, when the P-CSCF or S-CSCF does not have the next node information with which an IMS signaling message should be transferred, the IMS signaling message is transferred via I-CSCF 112. Furthermore, I-CSCF 112 may also confirm information of a CSCF, to which the message is transferred, by inquiring of HSS 118 the information. For example, a case will be described where an SIP INVITE message is sent.

In this case, the SIP INVITE message is first sent from a calling-side UE to a P-CSCF in a domain where the UE is located (calling side domain) via the IP core network and transferred from the P-CSCF to the calling side S-CSCF. After being subjected to appropriate processing at the calling side S-CSCF, the SIP INVITE message is transferred to an S-CFCS in a called side domain. In this case, the SIP INVITE message may go by way of I-CSCF 112. The called side S-CSCF transfers the received SIP INVITE message to a called-side UE via a P-CSCF.

The operator's IP core network 124 shown in FIG. 1 performs routing of communication data, QoS (Quality of Service) control, and management of position information of a terminal or the like.

FIG. 2 is a flow illustrating an example of a procedure until a VoIP call is made using a 3GPP IMS. FIG. 2 illustrates a flow example when UE 100 makes a phone call to UE 102. As shown in FIG. 2, an SIP INVITE message is transmitted from UE 100 to UE 102 via the IMS network (step (hereinafter, referred to as "ST") 11), and an SIP 183 Session Progress message is transmitted from UE 102 to UE 100 via the IMS network (ST12). Thus, the SIP INVITE message and the SIP 183 Session Progress message are exchanged between the UEs, and communication-related negotiation is thereby performed.

An SDP (Session Description Protocol) offer added to the SIP INVITE message describes a mechanism used in VoIP communication. Examples of the mechanism described include a codec scheme or codec mode, and protocol-related candidates. The codec scheme or codec mode includes an element adopted for this codec such as a bit rate, algorithmic delay, or the number of channels. Furthermore, the protocol includes the type of an RTP (Real-time Transport Protocol) payload format or the like. Upon receiving the SIP INVITE message in ST11, UE 102 selects one mechanism from among a plurality of candidates described in the SDP offer and describes the mechanism in an SDP answer. In ST12, UE 102 adds the SDP answer to SIP 183 Session Progress message and sends it to UE 100.

The IMS network analyzes the mechanism selected by UE 102 and issues an instruction for allocating a resource corresponding to the analysis result to this call session to the IP core network. According to the instruction from the IMS network, resource allocation processing is performed in the IP core network and the wireless access network (ST13). When the resource allocation processing is completed, UE 102 calls the user (ST14), and when the user responds to the call, a 200OK message is transmitted to UE 100 (ST15), and a call is started between UE 100 and UE 102 (ST16).

FIG. 3 shows an example of the SDP offer and SDP answer. In FIG. 3, with the SDP offer, UE 100 offers four modes: AMR-WB (Adaptive Multi Rate-Wide Band) bandwidth-efficiency mode, AMR-WB octet-align mode, AMR bandwidth-efficiency mode and AMR octet-align mode. Furthermore, the AMR bandwidth-efficiency mode is selected in UE 102.

The bandwidth-efficiency mode and octet-align mode follow an RTP payload format used for AMR (or AMR-NB: Narrow Band) and AMR-WB described in Non-Patent Literature (hereinafter, abbreviated as NPL) 1. Furthermore, NPL 2 defines the codec bit rate at this time to be AMR 4.75, 5.90, 7.40, or 12.2 kbps.

When necessary resources are not allocated in the resource allocation processing (ST13 shown in FIG. 2), this is regarded as a negotiation failure and the procedure is repeated over again starting from the transmission of the SIP INVITE message (ST11). For this reason, it is recommended to use a rather low, limited range of bit rates so that resource allocation is reliably performed. For example, NPL 3 supports AMR-NB: 4.75, 5.15, 5.90, 6.70, 7.40, 7.95, 10.2, and 12.2 kbps, and NPL 4 supports AMR-WB: 6.60, 8.85, 12.65, 14.25, 15.85, 18.25, 19.85, 23.05 and 23.85 kbps. NPL 2 recommends use of AMR-NB: 4.75, 5.90, 7.40 and 12.2 kbps, and AMR-WB: 6.60, 8.85 and 12.65 kbps.

CITATION LIST

Non-Patent Literature

NPL 1
IETF RFC 4867, "RTP Payload Format and File Storage Format for the Adaptive Multi-Rate (AMR) and Adaptive Multi-Rate Wideband (AMR-WB) Audio Codecs"
NPL 2
3GPP TS 26.114 v9.3.0, "IP Multimedia Subsystem (IMS); Multimedia Telephony; Media handling and interaction"
NPL 3
3GPP TS 26.101 v9.0.0, "Mandatory speech codec speech processing functions; Adaptive Multi-Rate (AMR) speech codec frame structure"
NPL 4
3GPP TS 26.201 v9.0.0, "Speech codec speech processing functions; Adaptive Multi-Rate-Wideband (AMR-WB) speech codec Frame structure"

SUMMARY OF INVENTION

Technical Problem

The above-described codec mode selection in the negotiation at the start of a call is performed independently of the network situation in which data is actually exchanged. For this reason, there is a problem that an appropriate codec mode may not be selected as the codec mode used at the start of a call or for an entire call period. In EVS (Enhanced Voice Services) currently being discussed in 3GPP SA4, support of higher bit rates than those of AMR and AMR-WB, support of a plurality of algorithmic delays and support of two channels (stereo) or the like are under study. Thus, EVS in particular requires a suitable codec mode to be selected.

With respect to the above-described problem, a method is proposed whereby a UE notifies a server of a bandwidth of a current air interface and causes a server to determine a bit rate based on the bandwidth of the air interface (e.g., see "Japanese Translation of a PCT Application Laid-Open No. 2006-500808"). Furthermore, a method is proposed whereby a UE monitors the situation of a wireless period and adjusts a suitable de-jitter buffer length according to the situation of the wireless period (e.g., see Specification of US Patent Application Publication No. 2006/0077994).

However, since the UE monitors the wireless status (situation of the bandwidth or wireless period of the current air interface) in either method, a corresponding burden is placed on the UE. Moreover, the above-described method does not take any end-to-end communication situation (quality of communication path between UEs) into consideration.

Furthermore, NPL 2 describes a method of selecting a codec mode which ensures reliable communication irrespective of the communication situation during negotiation (that is, a codec mode which is less likely to result in a negotiation failure). NPL 2 further describes a method of starting a call using a low codec bit rate within a range of codec bit rates selected by negotiation. In this method, the codec bit rate is adjusted within the selected range of codec bit rates in accordance with the communication situation (quality of communication path between UEs) of an end-to-end network after the start of a call. However, this method not only cannot set any appropriate codec bit rate (codec bit rate suitable for the actual communication situation) from the start of a call but also limits an upper limit of codec bit rates available for the entire call period.

On the other hand, there can also be a method whereby a network node feeds back the communication situation of a network (quality of the communication path between UEs) to the UEs and the UEs select a codec mode according to the communication situation of the network. However, this method causes the amount of traffic of the network to increase, burdening the network.

It is an object of the present invention to provide a communication terminal and a codec mode selection method capable of selecting a codec mode according to the quality of a communication path between terminals from initial stages of communication while suppressing a processing load on the network and the terminal (UE).

Solution to Problem

A terminal according to an aspect of the present invention is a terminal that transmits to a partner terminal which is a communicating partner of the terminal, a codec mode selected from among a plurality of codec mode candidates notified of from the partner terminal when communication starts between the terminal and the partner terminal, and adopts a configuration including: a receiving section that receives first information relating to characteristics of an access network to which the partner terminal is currently connected; a determining section that compares the first information with second information relating to characteristics of an access network to which the terminal is currently connected and determines a communication format between the terminal and the partner terminal; and a selection section that selects a codec mode to be used to communicate with the partner terminal from among the plurality of codec mode candidates based on the communication format determined by the determining section.

A codec mode selection method according to an aspect of the present invention is a codec mode selection method for a communication system in which when communication starts between a first terminal and a second terminal which is a communicating partner of the first terminal, the first terminal transmits to the second terminal, a codec mode selected from among a plurality of codec mode candidates notified of from the second terminal, the method including: a step of notifying the first terminal of first information relating to characteristics of an access network to which the second terminal is currently connected, by the second terminal; a step of receiving the first information by the first terminal; a step of comparing the first information with second information relating to characteristics of an access network to which the first terminal is currently connected and determining a communication format between the first terminal and the second terminal by the first terminal; and a step of selecting a codec mode to be used to communicate with the second terminal from among the plurality of codec mode candidates based on the determined communication format by the first terminal.

ADVANTAGEOUS EFFECTS OF INVENTION

According to the present invention, it is possible to determine the situation of a communication path between terminals and select an appropriate codec mode by using information held by the terminals as negotiation information without applying a processing load to either the network or the terminal.

BRIEF DESCRIPTION OF DRAWINGS

FIG. 3 is a diagram illustrating an example of SDP offer and SDP answer;

FIG. 8 is a diagram illustrating an example of SDP offer according to Embodiment 1 of the present invention;

FIG. 9 is a diagram illustrating the correspondence between a codec mode set and a number according to Embodiment 1 of the present invention;

FIG. 11 is a diagram illustrating an example of SDP answer according to Embodiment 1 of the present invention;

FIG. 14 is a diagram illustrating an example of SDP offer according to Embodiment 3 of the present invention;

FIG. 15 is a diagram illustrating the correspondence between a codec mode set and a number according to Embodiment 3 of the present invention;

FIG. 17 is a diagram illustrating an example of SDP answer according to Embodiment 3 of the present invention;

FIG. 19 (A and B) are diagrams illustrating codec mode numbering and an RTP payload format (first example) according to Embodiment 4 of the present invention;

FIG. 20 (A and B) are diagrams illustrating codec mode numbering and an RTP payload format (second example) according to Embodiment 4 of the present invention;

FIG. 21 (A and B) are diagrams illustrating codec mode numbering and an RTP payload format (third example) according to Embodiment 4 of the present invention;

FIG. 22 (A-C) are diagrams illustrating codec mode numbering and an RTP payload format (first example) according to Embodiment 5 of the present invention;

FIG. 23 (A-C) are diagrams illustrating codec mode numbering and an RTP payload format (second example) according to Embodiment 5 of the present invention;

FIG. 24 (A and B) are diagrams illustrating an example of the operator's policy and SDP offer according to Embodiment 6 of the present invention;

FIG. 25 (A and B) are diagrams illustrating an example of the operator's answer and SDP offer according to Embodiment 6 of the present invention;

FIG. 29 (A and B) are diagrams illustrating a second example of the RTP payload format according to Embodiment 8 of the present invention; and FIG. 30 (A-D) are diagrams illustrating a third example of the RTP payload format according to Embodiment 8 of the present invention.

DESCRIPTION OF EMBODIMENTS

Hereinafter, embodiments of the present invention will be described in detail with reference to the accompanying drawings.

Figure 4:
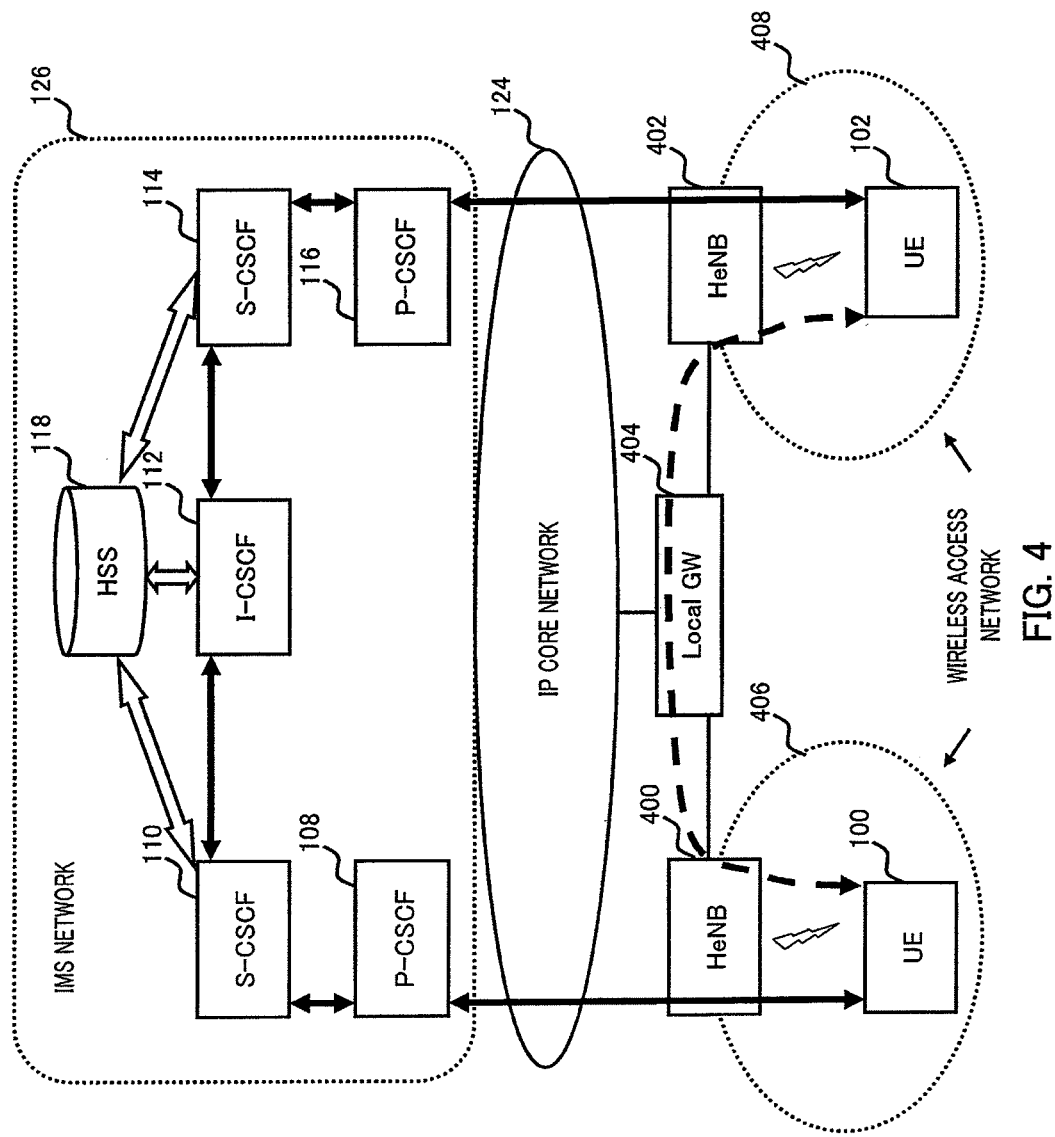
FIG. 4 is a diagram illustrating an example of network configurations according to each embodiment of the present invention.

FIG. 4 is a diagram illustrating an example of network configurations and a positional relationship between terminals according to each embodiment of the present invention. In FIG. 4, components identical to those in FIG. 1 will be assigned identical reference numerals and descriptions thereof will be omitted.

HeNBs (Home eNode B) 400 and 402 are assumed to be small base stations (here femto base stations; for example, see "3GPP TS 23.830 v9.0.0, "Architecture aspects of Home NodeB and Home eNodeB;" the same shall apply hereinafter) and hold a CSG ID (Closed Subscriber Group Identifier; for example, see "3GPP TS 25.401 v9.0.0, "UTRAN overall description") indicating that only UEs held by a limited number of users can be connected to respective HeNBs.

HeNB 400 constitutes wireless access network 406 and HeNB 402 constitutes wireless access network 408.

In the network configurations shown in FIG. 4, HeNBs 400 and 402 are connected to identical local GW (gateway) 404. Thus, UEs (UE 100 and UE 102) connected to HeNB 400 and HeNB 402 respectively can transmit/receive data via local GW 404 without going by way of the operator's IP core network 124.

Since only a limited number of users are connected to wireless access networks 406 and 408 shown in FIG. 4, the amount of wireless resource allocatable per UE in each wireless access network is large. Such a configuration is applicable, for example, to a case where a private in-house telephone network is constructed using HeNBs. FIG. 4 shows an example where local GW 404 is independent of HeNBs 400 and 402, but the present invention is not limited to this. Other configurations may also be adopted, for example, a configuration in which local GW 404 is set in each of the HeNBs 400 and 402 and the local GW set in each HeNB is connected directly or via another node.

Figure 5:
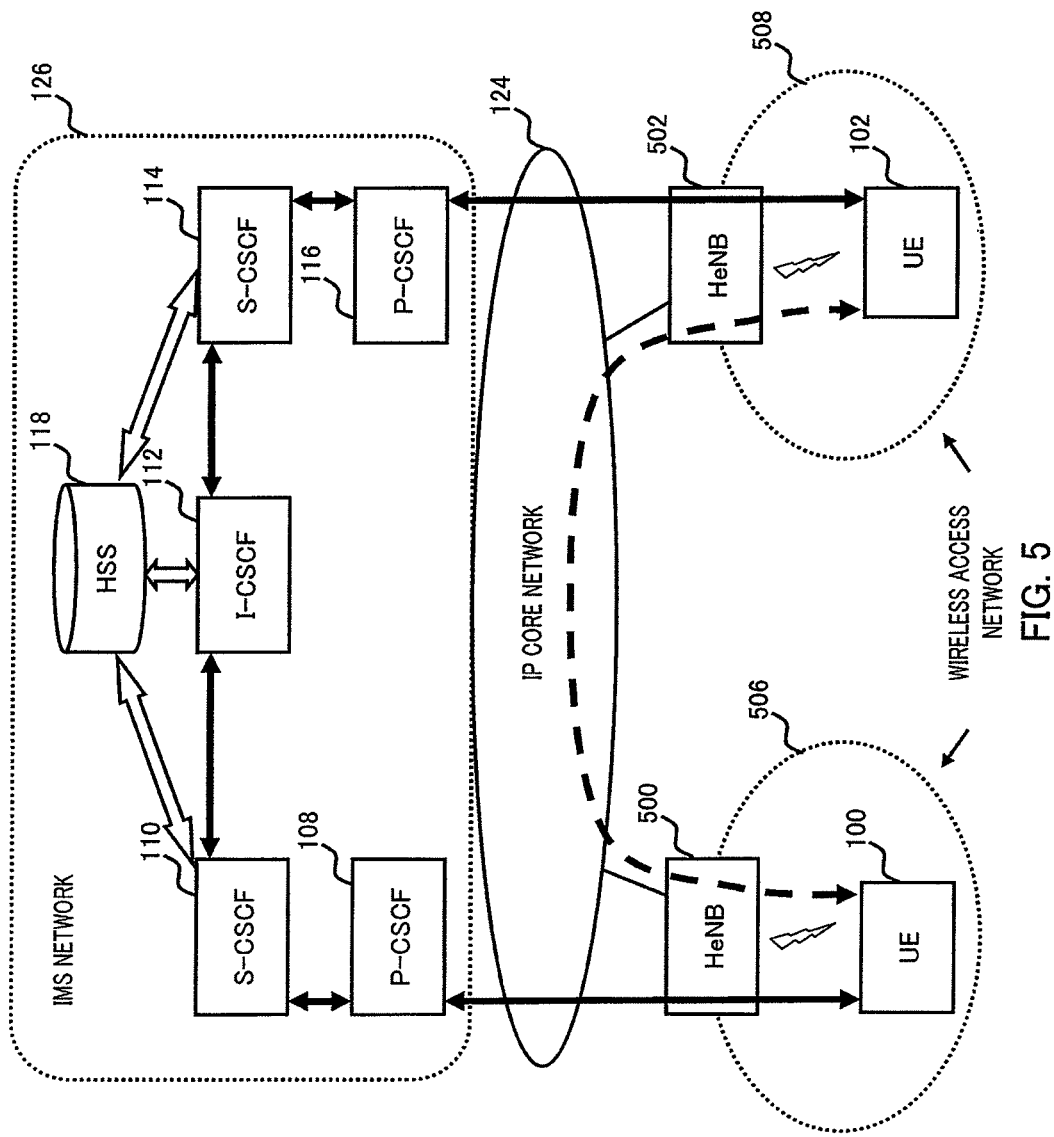
FIG. 5 is a diagram illustrating an example of network configurations according to each embodiment of the present invention.

FIG. 5 is a diagram illustrating another example of the network configurations and positional relationship between terminals according to each embodiment of the present invention. In FIG. 5, components identical to those in FIG. 1 will be assigned identical reference numerals and descriptions thereof will be omitted.

HeNBs 500 and 502 are small base stations (femto base stations), and HeNB 500 constitutes wireless access network 506 and HeNB 502 constitutes wireless access network 508.

In the network configurations shown in FIG. 5, HeNB 500 and HeNB 502 are connected to the operator's IP core network 124 independently of each other. Thus, UEs (UE 100 and UE 102) connected to HeNB 500 and HeNB 502 respectively transmit/receive data via the operator's IP core network 124. However, since only a limited number of users are connected to wireless access networks 506 and 508 as in the case of FIG. 4, the amount of wireless resource allocatable per UE in each wireless access network is large. Such a configuration is applicable, for example, to a case where an HeNB is installed to a private house or the like.

In the following description, the communication format between UE 100 and UE 102 shown in FIG. 4 (communication format via the HeNB to which each UE is connected and the local GW) is called "HeNB+local network communication."

Furthermore, the communication format between UE 100 and UE 102 shown in FIG. 5 (communication format via the HeNB to which each UE is connected and the IP core network) is called "HeNB+IP core network communication."

Figure 6:
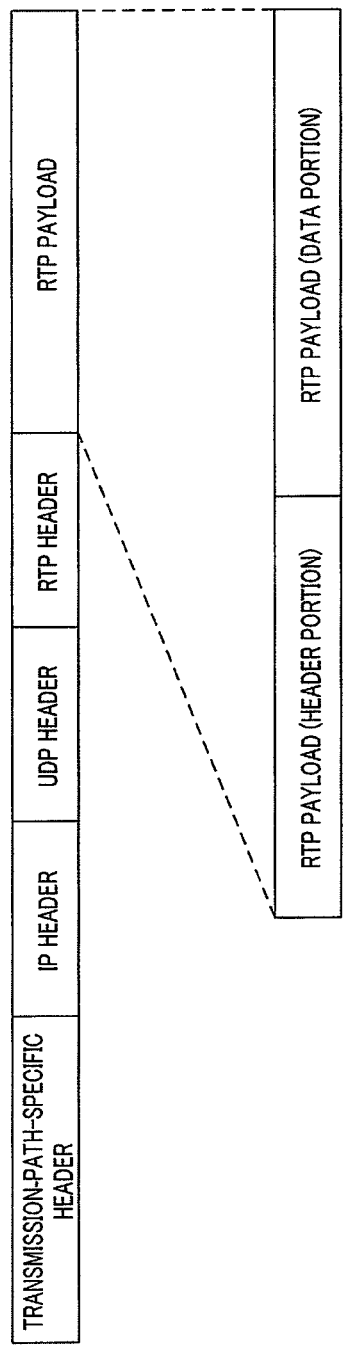
FIG. 6 is a diagram illustrating an RTP packet according to each embodiment of the present invention.

Here, RTP-related terms used in each embodiment of the present invention will be described using FIG. 6. An RTP packet is made up of an RTP header and an RTP payload as shown in FIG. 6.

The RTP header is as described in RFC (Request for Comments) 3550 of IETF (Internet Engineering Task Force) and is common irrespective of the type of the RTP payload (type of codec or the like). The format of the RTP payload differs depending on the type of the RTP payload. As shown in FIG. 6, the RTP payload is made up of a header portion and a data portion, but the header portion may not exist depending on the type of the RTP payload. The header portion of the RTP payload includes information for identifying the number of bits of encoded data such as speech and moving images. The data portion of the RTP payload includes, in addition to encoded data such as speech and moving images, for example, padding added when the length of the RTP payload is not a multiple of one octet (8 bits). Furthermore, as shown in FIG. 6, when an RTP packet is transmitted, headers in lower layers (UDP (User Datagram Protocol) header, IP header, and transmission-path-specific header which is equivalent to or lower than IP) are further added.

(Embodiment 1)

Figure 7:
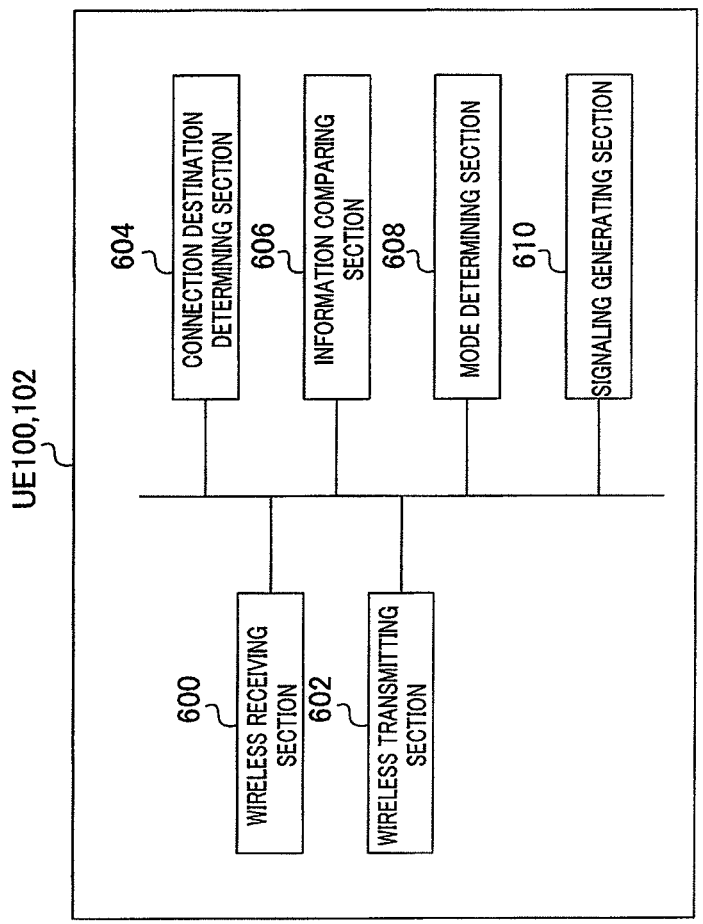
FIG. 7 is a block diagram illustrating a configuration of a terminal (UE) according to Embodiment 1 of the present invention.

FIG. 7 is a block diagram illustrating a configuration of a terminal (UE 100, 102) according to the present embodiment. To avoid complicated explanation, FIG. 7 illustrates principal components relating to negotiation regarding communication between terminals closely associated with the present invention (e.g., components relating to ST11 to ST15 shown in FIG. 2).

When the terminal (UE 100, 102) shown in FIG. 7 operates on a calling-side, wireless receiving section 600 therein receives a signaling message (SIP 183 Session Progress message) notified of from a partner terminal (called-side UE) which is a communicating partner. Wireless receiving section 600 outputs the received signaling message to mode determining section 608. This signaling message includes, for example, a codec mode set (combination of bit rate, algorithmic delay, the number of channels or the like) described in an SDP answer. On the other hand, when the terminal operates on a called side, wireless receiving section 600 receives a signaling message (SIP INVITE message) notified from the UE (calling side) which is the communicating partner. Wireless receiving section 600 then outputs the received signaling message to information comparing section 606 and mode determining section 608. This signaling message includes, for example, codec mode set candidates (candidate of a combination of bit rate, algorithmic delay, the number of channels or the like) described in an SDP offer and information relating to characteristics of a wireless access network to which the UE as the communicating partner is currently connected.

Wireless transmitting section 602 transmits a signaling message (SIP INVITE message or SIP 183 Session Progress message) outputted from signaling generating section 610 to the UE which is the communicating partner.

Connection destination determining section 604 determines characteristics of the wireless access network to which the UE is currently connected and holds information relating to the characteristics of the wireless access network. Connection destination determining section 604 outputs information relating to the characteristics of the wireless access network to information comparing section 606 and signaling generating section 610.

When the terminal operates on a called side, information comparing section 606 therein compares information relating to the characteristics of the wireless access network to which the UE is currently connected, with information relating to the characteristics of the wireless access network to which the UE (calling side) as the communicating partner is currently connected. The former is information inputted from connection destination determining section 604 and the latter is information included in the signaling message inputted from wireless receiving section 600.

To be more specific, information comparing section 606 compares information relating to the characteristics of both wireless access networks and determines the communication format between its own terminal and the partner terminal. For example, information comparing section 606 determines which corresponds to its own terminal and the partner terminal among HeNB+local network communication, HeNB+IP core network communication or different communication format. Here, the HeNB+local network communication has a communication format in which terminals are connected via a communication network constructed of an identical HeNB, a plurality of HeNBs, or a plurality of HeNBs and a VPN (Virtual Private Network) backbone. On the other hand, the HeNB+IP core network communication has a communication format in which terminals are connected to different HeNBs (femto base stations) via IP core network 124. Information comparing section 606 outputs the determined communication format to mode determining section 608.

When the terminal operates on a calling side, mode determining section 608 determines the codec mode set described in the SDP answer included in the signaling message inputted from wireless receiving section 600, as the codec mode set used for communication between its own terminal and the communicating partner. When the terminal operates on a called side, mode determining section 608 therein selects a codec mode set used for communication between its own terminal and the partner terminal from among codec mode set candidates described in the SDP offer included in the signaling message inputted from wireless receiving section 600. This selection is performed based on the communication format inputted from information comparing section 606.

When the terminal operates on a calling side, signaling generating section 610 generates a signaling message including information which is inputted from connection destination determining section 604 and which relates to characteristics of the access network to which the terminal is connected. In this way, the called-side UE is notified of information relating to characteristics of the access network to which the calling-side UE is connected. When the terminal operates on a called side, signaling generating section 610 generates a signaling message including the codec mode set determined by mode determining section 608. Signaling generating section 610 outputs the generated signaling message to wireless transmitting section 602.

Next, the processing of the terminals (UE 100 and UE 102) according to the present embodiment will be described in detail using FIG. 7.

In the following description, it is assumed that in FIGS. 4 or 5, UE 100 is currently connected to HeNB 400 or HeNB 500, UE 102 is connected to HeNB 402 or 502 and UE 100 makes a phone call to UE 102. When a call starts, UE 100 (calling-side UE) and UE 102 (called-side UE) do not hold information relating to the location of each other's communicating partner (e.g., cell information indicating a cell (HeNB) to which a UE is connected and position information indicating the position of the UE).

Connection destination determining section 604 of UE 100 determines characteristics of wireless access network 406 (or 506) to which UE 100 is connected. For example, connection destination determining section 604 determines the situation of wireless resources allocated to UE 100 (allocatable wireless resources or a proportion of wireless resources), based on the CSG ID of HeNB 400 (or 500) to which UE 100 is currently connected. For example, when the CSG ID indicates a femto base station, connection destination determining section 604 determines that the femto base station has a large amount of resource allocatable to UE 100.

Furthermore, as another example, connection destination determining section 604 determines that the wireless access network to which UE 100 is currently connected is a wireless access network other than a wireless access network dedicated to mobile phones of 3GPP or the like, for example, one configured of a wireless LAN. This determination is performed based on wireless characteristics (wireless frequency band or signaling or the like) of a wireless access network. In this case, connection destination determining section 604 determines that, for example, the transmission/reception format (the number of frames sent at a time, RTP payload format or the like) of communication data may be any format other than the one limited to a wireless access network dedicated to mobile phones of 3GPP or the like.

Signaling generating section 610 of UE 100 generates a signaling message for call control (e.g., SIP INVITE message) in which information to be notified of to the communicating partner (UE 102) is described. For example, when connection destination determining section 604 determines characteristics of a wireless access network, signaling generating section 610 describes, when the wireless access network to which its own terminal is currently connected holds a CSG ID, the CSG ID in the SDP offer included in the SIP INVITE message. Alternatively, signaling generating section 610 may also describe the CSG ID in the SIP header (e.g., P-Access-Network-Info header field) (e.g., see "3GPP TS 24.229 v10.0.0, "Session Initiation Protocol (SIP) and Session Description Protocol (SDP)"").

Furthermore, as the information relating to characteristics of the wireless access network, a base station ID (e.g., see "3GPP TS 25.401 v9.0.0, "UTRAN overall description"") may also be used instead of the CSG ID. Each UE can identify the characteristics of the wireless access network (e.g., whether the number of allocatable wireless resources per UE in the wireless access network is large or not) based on the CSG ID or base station ID (information relating to characteristics of the wireless access network). For example, based on the CSG ID or base station ID, each UE determines, if the base station that constitutes the wireless access network is a femto base station, that the amount of allocatable wireless resource per UE in the wireless access network is large.

Furthermore, signaling generating section 610 of UE 100 creates a candidate of the codec mode set taking into account the possibilities of all or some characteristics of wireless access network 408 (or 508) to which the communicating partner (UE 102) is connected. Signaling generating section 610 of UE 100 describes the codec mode set candidate in the SDP offer.

FIG. 8 shows a description example of the SDP offer. For example, when the CSG ID of the wireless access network to which UE 100 is connected is "Alice-femto," "a=csg: Alice-femto" is described in the SDP offer as shown in FIG. 8. The description method is not limited to this, and may be a different one. Furthermore, as a method of describing codec mode set candidates in consideration of the possibilities of all or some characteristics of the wireless access network to which the communicating partner (UE 102) is connected, for example, only numeric values associated with the respective codec mode sets may be described. These numeric values are "0x00," "0x01" and "0x02" in FIG. 8. This makes it possible to reduce the amount of description in the SDP. Furthermore, the codec mode set may also be expressed using symbols or other methods in addition to the correspondence between a codec mode set and a numeric value.

For example, FIG. 9 shows the correspondence between numeric values (numbers) "0x00," "0x01" and "0x02" shown in FIG. 8, meanings represented by these numeric values and corresponding codec mode sets.

To be more specific, "0x00" shown in FIG. 9 means, for example, normal communication which is different from communication corresponding to "0x01" and "0x02" which will be described later. "0x00" shown in FIG. 9 corresponds to a codec mode set having a bit rate (approx. 6 kbps, approx. 8 kbps, approx. 12 kbps) with a low algorithmic delay. In normal communication, for example, a call is started at a low bit rate among selectable bit rates and a codec bit rate is then selected in accordance with quality of a communication path between UEs. "0x01" shown in FIG. 9 means communication via the IP core network (HeNB+IP core network communication; e.g., see FIG. 5 (private house)), and corresponds to a codec mode set having a bit rate (approx. 6 kbps, approx. 8 kbps, approx. 12 kbps, approx. 24 kbps) with a low algorithmic delay. Furthermore, "0x02" means communication via the local GW (HeNB+ local network communication; e.g., see FIG. 4 (in-house telephone network)) and corresponds to a codec mode set having a bit rate (approx. 6 kbps, approx. 8 kbps, approx. 12 kbps, approx. 24 kbps) with a high algorithmic delay.

That is, in FIG. 9, "0x02" is a codec mode set that provides codec of the highest quality (high bit rate, long delay), followed by codec mode sets "0x01" and "0x00" in descending order of quality (lower bit rate, lower delay). Each terminal (UE 100, 102) may store the correspondence shown in FIG. 9 beforehand.

The signaling message (SIP INVITE message) generated in signaling generating section 610 of UE 100 is transmitted to UE 102 via wireless transmitting section 602 by way of IMS network 126.

On the other hand, wireless receiving section 600 of UE 102 receives the signaling message (SIP INVITE message) transmitted from UE 100.

Connection destination determining section 604 of UE 102 determines characteristics of wireless access network 408 (or 508) to which UE 102 is connected in the same way as UE 100.

Information comparing section 606 of UE 102 checks whether or not the received signaling message describes information relating to characteristics of the wireless access network (wireless access network 406 (or 506)) to which the communicating partner (UE 100) is connected. When the information relating to characteristics of the wireless access network is described, information comparing section 606 compares the characteristics of the wireless access network of the communicating partner and the characteristics of the wireless access network to which the terminal is connected. Information comparing section 606 then determines the communication format (what kind of communication is possible) between the terminal (UE 102) containing this information comparing section 606 and the communicating partner (UE 100). For example, information comparing section 606 compares the CSG ID transmitted as information relating to characteristics of the wireless access network to which the communicating partner (UE 100) is connected, with the CSG ID which is information relating to characteristics of the wireless access network to which its own terminal (UE 102) is connected. Information comparing section 606 then determines whether its own terminal and the communicating partner are connected to their respective HeNBs of an identical in-house telephone network or connected to their respective private house HeNBs, or any one or both of the terminals is/are connected to a public base station (eNB). Alternatively, information comparing section 606 may also compare the respective pieces of information relating to characteristics of the wireless access networks to which the communicating partner (UE 100) and its own terminal (UE 102) are connected respectively, and determine whether both terminals are physically located close to each other (e.g., whether or not the number of hops of the data path is equal to or below a predetermined threshold).

Mode determining section 608 of UE 102 determines the codec mode set (combination of the bit rate, algorithmic delay, the number of channels or the like) based on the determination result in information comparing section 606 (communication format between its own terminal and the communicating partner).

Figure 10:
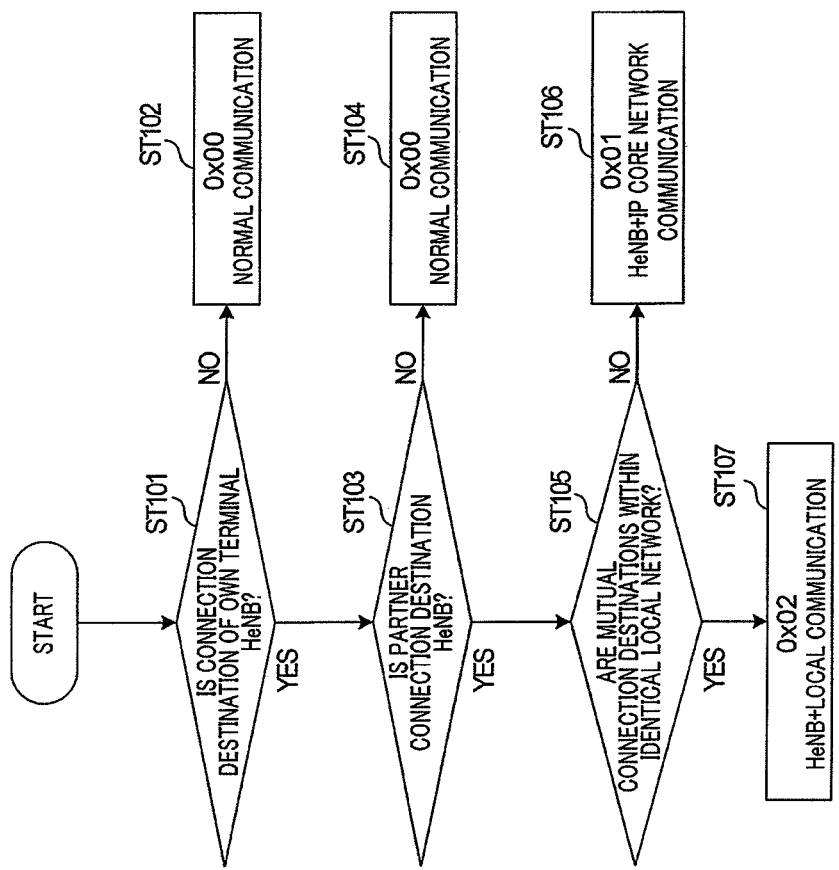
FIG. 10 is a flowchart showing a processing flow in the information comparing section and the mode determining section according to Embodiment 1 of the present invention.

FIG. 10 shows an example of the processing in information comparing section 606 and mode determining section 608 of the present embodiment. FIG. 10 is a flowchart showing a processing flow in information comparing section 606 and mode determining section 608.

In FIG. 10, information comparing section 606 determines in ST101 whether or not its own terminal is connected to the HeNB. When its own terminal is not connected to the HeNB (ST101: NO), mode determining section 608 selects a codec mode set corresponding to normal communication (0x00) in ST102.

When its own terminal is connected to the HeNB (ST101: YES), information comparing section 606 determines in ST103 whether or not the communicating partner is connected to the HeNB. When the communicating partner is not connected to the HeNB (ST103: NO), mode determining section 608 selects a codec mode set corresponding to normal communication (0x00) in ST104. That is, mode determining section 608 selects the codec mode set corresponding to normal communication (0x00) if at least one of its own terminal and the communicating partner is not connected to the HeNB.

When the communicating partner is connected to the HeNB (ST103: YES), information comparing section 606 determines in ST105 whether or not its own terminal and the communicating partner are connected within an identical local network.

When its own terminal and the communicating partner are not connected within an identical local network (ST105: NO), mode determining section 608 selects a codec mode set corresponding to "HeNB+IP core network communication (0x01)" in ST106. When its own terminal and the communicating partner are connected within an identical local network (ST105: YES), mode determining section 608 selects a codec mode set corresponding to "HeNB+local network communication (0x02)" in ST107.

That is, mode determining section 608 selects a codec mode set of the highest quality when the communication format between its own terminal and the communicating partner is "HeNB+local network communication." Furthermore, when the above-described communication format is "HeNB+IP core network communication," mode determining section 608 selects a codec mode set of higher quality than that of "normal communication."

Thus, mode determining section 608 determines a codec mode (or codec mode set) used for communication between its own terminal and the communicating partner based on the determination result in information comparing section 606 as to whether or not it is possible to secure a communication path of good quality between its own terminal and the communicating partner. That is, when mode determining section 608 determines that it is possible to secure a communication path of good quality (e.g., ST101: YES and ST103: YES shown in FIG. 10), mode determining section 608 selects a codec mode set ("0x01" or "0x02") of high quality (high bit rate and long delay) as the codec mode (or codec mode set) to be used. On the other hand, when mode determining section 608 determines that it is unclear whether or not it is possible to secure a communication path of good quality (e.g., ST101: NO or ST103: NO shown in FIG. 10), mode determining section 608 selects a normal codec mode set (that is, a codec mode set in which communication is possible in any communication situation as described above) as the codec mode (or codec mode set) to be used.

Signaling generating section 610 of UE 102 describes the codec mode set selected by mode determining section 608 in part of the signaling message (e.g., SIP 183 Session Progress message) for call control, for example, SDP answer. In this case, signaling generating section 610 may describe the CSG ID of HeNB 402 (or 502) to which UE 102 is connected or a base station ID, in the SDP answer or SIP header.

FIG. 11 shows a description example of the SDP answer. For example, suppose that the CSG ID of the wireless access network to which UE 100 is connected is "Alice-femto" shown in FIG. 8 and the CSG ID of the wireless access network to which UE 102 is connected is "Bob-femto" (ST101, ST103: YES in FIG. 10). Furthermore, suppose that the wireless access network with the CSG ID ("Bob-femto")

and the wireless access network with the CSG ID ("Alice-femto") are not within an identical local network (ST105: NO in FIG. 10).

In this case, information comparing section 606 of UE 102 determines, for example, that its own terminal and the communicating partner are connected to HeNBs installed in the respective private houses or the like, and mode determining section 608 selects a codec mode set corresponding to "HeNB+IP core network communication (0x01)." Thus, the SDP answer shown in FIG. 11 describes "0x01" as the selected codec mode set. As shown in FIG. 11, information (Bob-femto) relating to characteristics of the wireless access network to which UE 102 is connected may also be described in the SDP answer.

The signaling message (e.g., SIP 183 Session Progress message) generated in signaling generating section 610 of UE 102 is transmitted to UE 100 via wireless transmitting section 602 by way of IMS network 126.

Upon receiving the signaling message transmitted from UE 102 via wireless receiving section 600, mode determining section 608 of UE 100 determines a codec mode set based on contents described in the SDP answer. In the example of FIG. 11, mode determining section 608 of UE 100 determines a codec mode set corresponding to "HeNB+IP core network communication (0x01)."

In this case, the CSG ID of the wireless access network to which the communicating partner (UE 102) of UE 100 is connected or base station ID may also be used as reference information.

Thus, in the present embodiment, when communication starts between the UEs, the calling-side UE notifies the partner terminal (called-side UE) which is the communicating partner of the CSG ID (or base station ID) as information relating to characteristics of the wireless access network to which the calling-side UE is connected. The called-side UE compares the information (CSG ID or the like) which is notified of from the partner terminal (calling-side UE) as the communicating partner and which relates to characteristics of the wireless access network to which the partner terminal (calling side) is connected, with information (CSG ID or the like) relating to characteristics of the wireless access network to which the called-side UE is connected. The called-side UE then determines the communication format between the called-side UE and the partner terminal. When the called-side UE can determine that a communication path of good quality can be reliably secured between the UEs, the called-side UE selects a codec mode (or codec mode set) of higher quality and with a longer delay as the codec mode set when communication starts. This corresponds, for example, to a case where the communication format is communication in an in-house telephone network or communication in a private house.

This allows each UE to select an appropriate codec mode set (combination of the bit rate, algorithmic delay, the number of channels or the like) in accordance with the quality of the communication path from the start of communication (initial stage of communication).

A case has been described in the present embodiment where the present invention is applied to the selection of a codec mode set as an example, but the present invention is not limited to this. The determination of characteristics of the connected wireless access network according to the present invention may be applied to the selection of a transmission/reception format when performing other negotiation necessary for communication, such as negotiation of a transmission/reception format (the number of frames sent at a time, RTP payload format or the like) of communication data.

Furthermore, in the present embodiment, it is only necessary to notify the communicating partner of information held in each UE (information relating to characteristics of the wireless access network) and it is not necessary to monitor the situation of the wireless access network (quality of the communication path) on either the network side or the UE side. Thus, it is possible to reduce the burden placed on the network and UE to select an appropriate codec mode (or codec mode set).

Thus, according to the present embodiment, information held by the terminal is used as negotiation information. This makes it possible to determine the situation of the communication path between the terminals and select an appropriate codec mode (or codec mode set) without applying processing load involved in transmission/reception of a beacon or signaling or the like in either the network or the terminals (UEs).

(Embodiment 2)

In the present embodiment, a network node of the IMS network checks information relating to characteristics of a wireless access network described by a UE in part of a signaling message in Embodiment 1. This network node is an operator providing a network, that is, a network node that has a processing function for call control.

Figure 12:
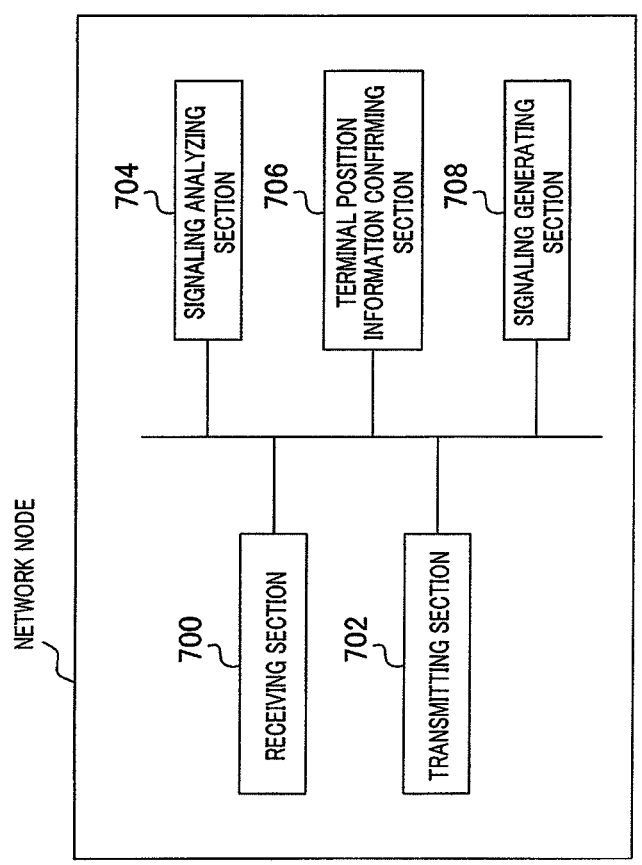
FIG. 12 is a block diagram illustrating a configuration of a network node according to Embodiment 2 of the present invention.

FIG. 12 is a block diagram showing a configuration of a network node according to the present embodiment.

In the network node shown in FIG. 12, upon receiving a signaling message from a UE, receiving section 700 outputs the signaling message to signaling analyzing section 704.

Transmitting section 702 transmits a signaling message inputted from signaling generating section 708 to a UE which is the destination of the signaling message.

Signaling analyzing section 704 analyzes information described in the signaling message inputted from receiving section 700 and outputs information requiring confirmation to an appropriate confirming section. For example, signaling analyzing section 704 passes to terminal position information confirming section 706, information (e.g., CSG ID or base station ID) relating to characteristics of the wireless access network to which the UE is currently connected out of the information described in the signaling message.

Terminal position information confirming section 706 confirms the appropriateness of information (CSG ID or the like, that is, position information of the terminal) relating to characteristics of the wireless access network to which the UE that has transmitted the signaling message is currently connected. At this time, terminal position information confirming section 706 may confirm the appropriateness using information held in this network node or may confirm it in cooperation with another network node (e.g., MME (Mobility Management Entity) and HSS (Home Subscriber Server); see "3GPP TS 23.002 v10.0.0, "Network Architecture""). Terminal position information confirming section 706 outputs the confirmation result to signaling generating section 708.

Signaling generating section 708 overwrites description contents needing to be corrected of the signaling message transmitted from the UE. For example, suppose that terminal position information confirming section 706 determines that information relating to characteristics of the wireless access network is appropriate. In this case, signaling generating section 708 may add to a signaling message, information indicating that the appropriateness has been confirmed by a network entity using a description method such as a flag, numeric value, and text. Furthermore, when terminal position information confirming section 706 determines that information relating to the characteristics of the wireless access network is not appropriate, signaling generating section 708 may delete the information relating to the characteristics of the wireless access network from the signaling message. Alternatively, signaling generating section 708 may add to the signaling message, information (appropriateness confirmation result) indicating the confirmation result in terminal position information confirming section 706. The corrected signaling message is transmitted to the destination of the signaling message via transmitting section 702.

The UE that has received the signaling message determines that the appropriateness has been confirmed by a network entity. In this case, the UE determines the communication format with the communicating partner using the information which is described in the signaling message and which relates to the characteristics of the wireless access network to which the communicating partner is connected, in the same way as in Embodiment 1. On the other hand, suppose that the UE that has received the signaling message has not successfully determined, for example, that the appropriateness has been confirmed by the network entity. In this case, the UE does not determine the communication format with the communicating partner using the information relating to the characteristics of the wireless access network to which the communicating partner is connected. That is, the UE may decide whether or not to determine the communication format with the partner terminal based on the confirmation result of the appropriateness in the network node.

This allows a UE to accurately determine the communication format between the UE and the partner terminal. That is, it is possible to improve the certainty of determination of the communication format between the UE and the partner terminal. Therefore, the present embodiment can determine the situation of the communication path between terminals more accurately than Embodiment 1 and select an appropriate codec mode (or codec mode set).

In the present embodiment, the network node may be an IMS network entity (P-CSCF and S-CSCF or the like; see "3GPP TS 23.002 v10.0.0, "Network Architecture"") or IP-PBX (Internet Protocol Private Branch eXchange) used to construct an in-house private telephone network or the like. For example, the P-CSCF (P-CSCF 108, 116 shown in FIGS. 4 or 5) which is one of IMS network entities is provided with a function of confirming and rewriting SDP contents. Therefore, if the P-CSCF is used as the network node according to the present embodiment, the SDP confirmation function can also be used to confirm the information relating to the characteristics of the wireless access network, and it is thereby possible to obtain effects similar to those of the present embodiment without increasing burdens on the network side.

Furthermore, a case has been described in the present embodiment where the network node notifies the UE of information indicating that the appropriateness has been confirmed, but it may not necessarily notify the UE of the information indicating that the appropriateness has been confirmed. For example, as described above, the network node deletes the information relating to the characteristics of the wireless access network determined to be inappropriate, from the signaling message. In this case, the UE to which the signaling message is transmitted will no longer determine the communication format using wrong information. Therefore, even if the network node does not notify the UE of the information indicating that the appropriateness has been confirmed, it is possible to improve the certainty in the determination of the communication format between the terminals in the same way as in the present embodiment. For example, the network node need not send the information indicating that the appropriateness has been confirmed for communication between the UEs connected to an identical operator's IP core network. Instead, the network node may notify of the information indicating that the appropriateness has been confirmed for communication between the UEs each connected to different operators' IP core networks.

(Embodiment 3)

The present embodiment selects a codec mode (or codec mode set) using information indicating the presence or absence of a possibility of UE handover in addition to information relating to characteristics of an access network to which the UE is connected. Furthermore, the present embodiment changes the codec mode (or codec mode set) when a change occurs in the presence or absence of a possibility of handover in the middle of a call.

Figure 13:
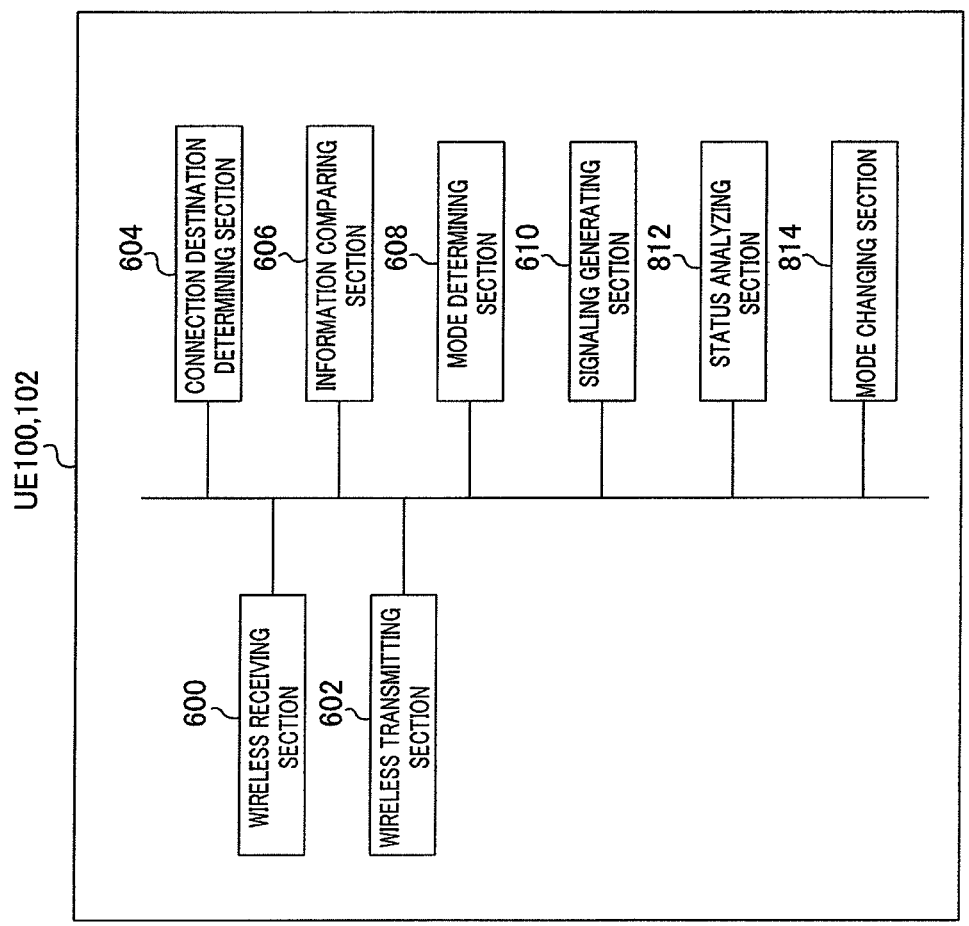
FIG. 13 is a block diagram illustrating a configuration of a terminal (UE) according to Embodiment 3 of the present invention.

FIG. 13 is a block diagram showing a configuration of a terminal (UE 100, 102) according to the present embodiment. In FIG. 13, components identical to those in FIG. 7 will be assigned identical reference numerals and descriptions thereof will be omitted. In the terminal shown in FIG. 13, status analyzing section 812 and mode changing section 814 are added to the components of the terminal shown in FIG. 7.

In the terminal shown in FIG. 13, status analyzing section 812 analyzes (determines) whether or not there is a possibility for its own terminal to perform handover from the type, status or the like of its own terminal. For example, when the UE is a stationary terminal for a telephone conference system, status analyzing section 812 determines that the possibility for its own terminal to perform handover is low. Furthermore, even when its own terminal is a small UE, if it is connected to stationary equipment, a speaker, microphone or the like, status analyzing section 812 determines that the possibility for its own terminal to perform handover is low. Alternatively, when its own terminal is provided with a telephone conference mode setting section (not shown) and the user explicitly selects a telephone conference mode (through an operation of the user interface of the UE), status analyzing section 812 determines that the possibility for its own terminal to perform handover is low. Status analyzing section 812 outputs information indicating the analysis result when communication starts, to signaling generating section 610. In this way, the analysis result (information indicating the presence or absence of the possibility for its own terminal to perform handover) is added to a signaling message and notified of to a communicating partner.

Furthermore, status analyzing section 812 analyzes the status of its own terminal during communication and outputs, when the status of its own terminal changes during communication, contents of the change of the status of its own terminal to mode changing section 814. For example, when a UE which communicates and is connected to stationary equipment, a speaker, microphone or the like is disconnected from such equipment, status analyzing section 812 outputs information indicating that its own terminal is disconnected from the equipment, to mode changing section 814.

Mode changing section 814 changes the codec mode (or codec mode set) currently in use based on the information inputted from status analyzing section 812. The change in the codec mode (or codec mode set) may be requested from the communicating partner by transmitting a signaling message for call control. Furthermore, such a request may also be made by adding change information indicating contents of the change of the codec mode (or codec mode set) to the header of communication data (e.g., RTP header, header portion of RTP payload, control information of communication data or RTCP (RTP Control Protocol)).

Next, the processing in the terminals (UE 100 and UE 102) according to the present embodiment will be described in detail using FIG. 13.

In the following description, as in the case of Embodiment 1, suppose that UE 100 is currently connected to HeNB 400 or HeNB 500, UE 102 is connected to HeNB 402 or 502 and UE 100 makes a phone call to UE 102 in FIGS. 4 or 5.

Status analyzing section 812 of UE 100 analyzes (determines) from the type and status or the like of UE 100 whether or not there is a possibility for UE 100 to perform handover.

Signaling generating section 610 of UE 100 describes information indicating the analysis result in part of a signaling message for call control, for example, SDP offer (or SIP header). Furthermore, signaling generating section 610 creates, as in the case of Embodiment 1, candidates for the codec mode (or codec mode set) taking into account characteristics of the wireless access network to which the communicating partner (UE 102) is connected. Furthermore, signaling generating section 610 creates, as in the case of Embodiment 1, candidates for the codec mode (or codec mode set) taking into account the possibility of the whole or part of each piece of information relating to UE 102 such as the possibility for the communicating partner (UE 102) to perform handover or the like. A signaling message (SIP INVITE message) including the information is transmitted to the communicating partner (UE 102) via wireless transmitting section 602.

FIG. 14 shows a description example of an SDP offer. For example, when status analyzing section 812 of UE 100 determines that the possibility for UE 100 to perform handover is low, "a=handover: low" is described in the SDP offer as shown in FIG. 14. Instead of describing the presence or absence of the possibility of handover as "low" or "high," the possibility may be expressed by a numeric value or symbol or the like. For example, when it is assumed that "0x00" represents a "high possibility of handover" and "0x01" represents a "low possibility of handover," the status of a low possibility of handover is described as "a=handover: 0x01." The description method is not limited to this, and may be a different one.

Next, FIG. 15 shows the correspondence between the codec mode set (including a codec mode set when the possibility for the UE to perform handover is low) and a numeric value (number) indicating the codec mode set according to the present embodiment. In FIG. 15, "0x03" is set in addition to the correspondence shown in FIG. 9 ("0x00," "0x01" and "0x02"). "0x03" shown in FIG. 15 means telephone conference communication and corresponds a bit rate of approx. 100 kbps and a codec mode set with a high algorithmic delay.

On the other hand, information comparing section 606 of UE 102 (called side) compares information relating to the terminal status (analysis result in status analyzing section 812 of UE 100) and characteristics of the connected wireless access network, with information relating to the terminal status of its own terminal (analysis result in status analyzing section 812 of UE 102) and characteristics of the connected wireless access network. The former is information included in the signaling message (SIP INVITE message) transmitted from UE 100. To be more specific, information comparing section 606 determines the communication format (what kind of communication is possible) between its own terminal (UE 102) and the communicating partner (UE 100) based on the comparison result. For example, information comparing section 606 determines that communication like a fixed telephone (high quality communication) is possible when both UEs 100 and 102 are connected to HeNBs and there is no possibility of handover.

Mode determining section 608 of UE 102 determines the codec mode set (combination of the bit rate, algorithmic delay, the number of channels or the like) based on the determination result (communication format between its own terminal and the communicating partner) in information comparing section 606.

Figure 16:
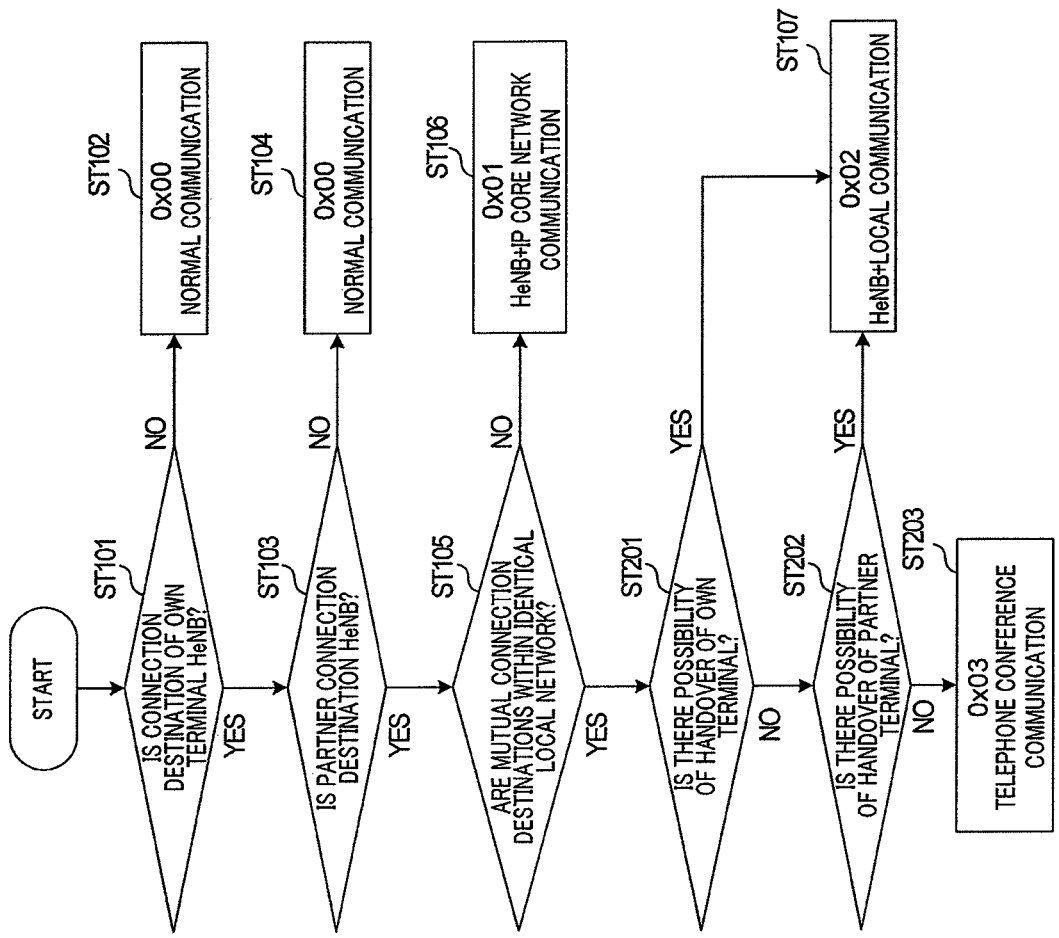
FIG. 16 is a flowchart showing a processing flow in the information comparing section and the mode determining section according to Embodiment 3 of the present invention.

FIG. 16 shows an example of the processing in information comparing section 606 and mode determining section 608 in the present embodiment. FIG. 16 is a flowchart illustrating a processing flow in information comparing section 606 and mode determining section 608. In FIG. 16, components that perform processing identical to the processing in FIG. 10 will be assigned identical reference numerals and descriptions thereof will be omitted.

In FIG. 16, the terminal (UE 102) and the communicating partner (UE 100) are connected within an identical local network (ST105: YES). In this case, information comparing section 606 determines in ST201 whether or not there is a possibility for its own terminal to perform handover and determines in ST202 whether or not there is a possibility for the communicating partner to perform handover. When there is a possibility for its own terminal to perform handover (ST201: YES) or there is a possibility for the communicating partner to perform handover (ST202: YES), mode determining section 608 in ST107 selects a codec mode set corresponding to "HeNB+local network communication (0x02)."

On the other hand, when there is neither possibility for its own terminal to perform handover (ST201: NO) nor possibility for the communicating partner to perform handover (ST202: NO), mode determining section 608 in ST203 selects a codec mode set corresponding to "telephone conference communication (0x03)."

Thus, mode determining section 608 selects a codec mode set used for communication between its own terminal and the communicating partner based on whether or not information comparing section 606 determines that a communication path of good quality can be secured between its own terminal and the communicating partner and whether or not there is a possibility for each of its own terminal and the communicating partner to perform handover. More specifically, when it is determined that a communication path of good quality can be secured (e.g., ST101: YES and ST103: YES shown in FIG. 16), and when there is a possibility for neither to perform handover (e.g., ST201: NO and ST202: NO shown in FIG. 16), the codec mode set (0x03) which has the highest quality and a long delay is selected from among selectable codec mode sets.

Signaling generating section 610 of UE 102 describes the codec mode set selected by mode determining section 608 in part of a signaling message (e.g., SIP 183 Session Progress message) for call control, for example, in an SDP answer. In this case, signaling generating section 610 may also describe the CSG ID of HeNB 402 (or 502) to which UE 102 is connected or base station ID and the presence or absence of a possibility for UE 102 to perform handover in the SDP answer or SIP header.

FIG. 17 shows a description example of the SDP answer. For example, suppose that the CSG ID of the wireless access network to which UE 100 is connected is "Panasonic-femto" shown in FIG. 14 and the CSG ID of the wireless access network to which UE 102 is connected is "Panasonic-femto" (ST101, ST103: YES in FIG. 16). Furthermore, suppose that the wireless access network with the CSG ID ("Panasonic-femto") and the wireless access network with the CSG ID ("Panasonic-femto") are within an identical local network (ST105: YES in FIG. 16). Furthermore, suppose that the possibilities for both UE 100 and UE 102 to perform handover are low (ST201, ST202: NO in FIG. 16). In this case, information comparing section 606 of UE 102 determines that UE 100 and UE 102 are each connected to HeNBs within an identical in-house local network and that there is no possibility for either UE 100 or UE 102 to perform handover. Mode determining section 608 then selects a codec mode set corresponding to "telephone conference communication (0x03)." Thus, the SDP answer shown in FIG. 17 describes "0x03" as the selected codec mode set.

As shown in FIG. 17, information (Panasonic-femto) relating to characteristics of the wireless access network to which UE 102 is connected and the presence or absence (handover: low) of a possibility for UE 102 to perform handover may be described in the SDP answer.

The signaling message (e.g., SIP 183 Session Progress message) generated in signaling generating section 610 of UE 102 is transmitted to UE 100 via wireless transmitting section 602 by way of IMS network 126.

Upon receiving the signaling message transmitted from UE 102 via wireless receiving section 600, mode determining section 608 of UE 100 determines the codec mode set based on contents described in the SDP answer. In the example of FIG. 17, mode determining section 608 of UE 100 determines a codec mode set corresponding to "telephone conference communication (0x03)."

In this case, the CSG ID of the connection destination of communicating partner (UE 102) of UE 100 or base station ID, or the presence or absence of a possibility of handover may also be used as reference information.

Figure 18:
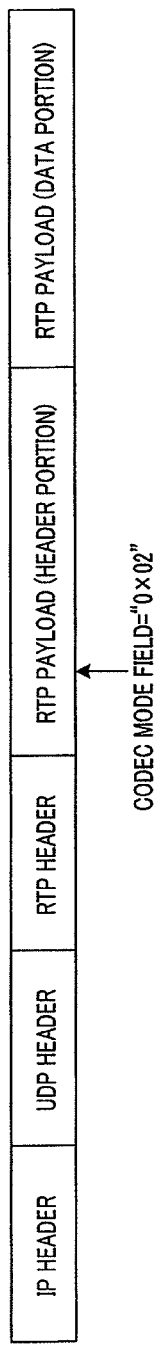
FIG. 18 is a diagram illustrating an example of the format of an IP packet according to Embodiment 3 of the present invention.

Furthermore, when the status of UE 100 or UE 102 changes during communication, mode changing section 814 may change the codec mode set. For example, suppose that the current codec mode set corresponds to "telephone conference communication (0x03)." In this case, mode changing section 814 describes the changed codec mode set (e.g., "under control of HeNB+local network communication (0x02)" in the header portion of the RTP payload or codec mode request field of RTCP feedback (e.g., see FIG. 18). Mode changing section 814 then urges the communicating partner to change the codec mode (or codec mode set) and at the same time also changes the codec mode (or codec mode set) of its own terminal. Furthermore, instead of the change destination codec mode set, individual codec modes such as the change destination bit rate, delay mode, the number of channels may also be directly specified in the codec mode request field. Furthermore, the change destination bit rate, delay mode, the number of channels or the like may also extend over a plurality of codec modes (or codec mode sets).

Thus, the UE uses not only characteristics of the wireless access network but also the presence or absence of a possibility of handover, and can thereby determine the communication format between its own terminal and the partner terminal which is the communicating partner more specifically than in Embodiment 1. Thus, the UE can select a codec mode (or codec mode set) of higher quality in accordance with the determined communication format.

Furthermore, when the possibility of handover changes in the UE or partner terminal during communication, the UE changes the codec mode (or codec mode set) currently in use. That is, even during communication, if the status of one of the UE and the communicating partner changes, that is, when the communication format between the UE and the communicating partner can change, the UE changes the codec mode (or codec mode set) in accordance with the change. This allows the UE to use an appropriate codec mode (or codec mode set) in accordance with the change in the communication format during communication.

Therefore, according to the present embodiment, it is possible to determine the situation of the communication path between terminals more specifically than in Embodiment 1 and select a more appropriate codec mode (or codec mode set).

(Embodiment 4)

In the present embodiment, an example of RTP payload format is shown below which is recommended in the case of a codec scheme in which there are many types of codec modes such as bit rates as in the case of the codec schemes shown in the examples of Embodiments 1 to 3. The RTP payload format example in the present embodiment is not limited to the cases where the negotiation method or codec mode (or codec mode set) is selected as described in Embodiments 1 to 3.

Here, suppose that 12 and 24 kbps are supported in scheme X (supposed to be "multirate codec") as bit rates in one scheme (or mode) of codec or a plurality of schemes (or modes) that can be used by being switched between the schemes (or modes) within one real-time session such as a call. In scheme Y (supposed to be "scalable codec"), suppose that basic parts 8, 12 and 24 kbps, first expanded parts 4 and 12 kbps, and second expanded part 8 kbps are supported as such bit rates. Here, scheme X and scheme Y may be different codecs or may be different modes within a single codec.

Here, the first expanded part and second expanded part of scalable codec may be, for example, Super Wideband expansion and Full Band expansion, or Enhance-compatible expansion or stereo expansion or the like. Furthermore, as a delay mode, suppose that both scheme X and scheme Y have both or one of different delays A and B. Furthermore, as the number of channels, suppose that two of 1 channel (mono) and 2 channels (stereo), or only 1 channel (mono) is supported.

FIG. 19 is a first example of numbering (Frame Type Index) of the codec mode (bit rates and a combination thereof in this example) and an RTP payload format in the present embodiment.

As shown in FIG. 19A, respective different Frame Type Indices are assigned to all combinations of bit rates. FIG. 19B is an example of the RTP payload format in the first example. As shown in FIG. 19B, Frame Type Index and Q bit are added at the header portion of the RTP payload in addition to the data portion of the RTP payload, as information on the RTP payload. Here, the data portion of the RTP payload includes one-frame encoded data and padding bits added to adjust the RTP payload length. Frame Type Index included in the header portion of the RTP payload indicates which combination in FIG. 19A is used. The Q bit included in the header portion of the RTP payload is equivalent to the Q bit described in NPL 1 and is an indicator of Frame Quality.

The delay mode may or may not be included in the header portion of the RTP payload. When the delay mode is included in the header portion of the RTP payload, the delay mode may be included in the table of FIG. 19A and Frame Type Index may be assigned. A bit indicating the delay mode (e.g., "0" for delay A and "1" for delay B) may be included in the RTP payload format.

As shown in FIG. 19B, the RTP payload format in the first example has no such field as Codec Mode Request described in NPL 1. By omitting this field, the size of the RTP payload can be reduced. However, when there is no problem with the size of the RTP payload (that is, when there is no problem even if several bits are added to the RTP payload format), a field like Codec Mode Request may be included. For example, RTCP may be used when there is no such field as Codec Mode Request and when the communicating partner is requested to change the codec mode (or codec mode set).

Furthermore, a plurality of frames (1-frame encoded data) may be sent simultaneously (in one IP packet). In this case, a bit for identifying which of the plurality of frames that are simultaneously sent is the last frame may be included in the header portion of the RTP payload.

The bits and fields included in the header are not limited to those shown in this example.

An example has been described in the present embodiment as shown in FIG. 19A where a series of Frame Type Indices are given to the respective bit rates of scheme X and scheme Y or combinations of bit rates so that scheme X and scheme Y can be treated as if they were an identical codec scheme. However, Frame Type Index and the RTP payload format may also be given to scheme X and scheme Y separately and used independently.

FIG. 20 is a second example illustrating numbering (Frame Type Index) of the codec mode (bit rate in this example) and an RTP payload format in the present embodiment.

As shown in FIG. 20A, Frame Type Indices are assigned to respective bit rates only. Frame Type Index shown in FIG. 20A specifies only a bit rate, but does not describe which codec or which combination of codecs is used. All codec modes applicable to the respective bit rates correspond to such combinations among the combinations in FIG. 19A (first example). For example, in FIG. 20A, suppose that the value of Frame Type Index is 1 (bit rate: 12 kbps). In this case, the frame contents may be a combination of Frame Type Index "0" (12 kbps in scheme X) that corresponds to the codec for which the bit rate in FIG. 19A becomes 12 kbps, "3" (12 kbps in scheme Y) or "5" (basic part of 8 kbps and first expanded part of 4 kbps in scheme Y). However, when FIG. 20A corresponds to only the codec in scheme Y, there are two possibilities: Frame Type Index "3" (12 kbps in scheme Y) and Frame Type Index "5" (basic part of 8 kbps, and first expanded part of 4 kbps in scheme Y). An encoder determines which combination should be selected from among these combinations of codec scheme and bit rate. Information indicating the combination determined by the encoder may be included in the encoded data.

FIG. 20B is an example of the RTP payload format in a second example. As shown in FIG. 20B, in addition to the data portion of the RTP payload, the header portion of the RTP payload includes Frame Type Index, Q bit, Codec Mode Request and R bit as information on the RTP payload. The data portion of the RTP payload includes 1-frame encoded data and padding bits added to adjust the RTP payload length. Frame Type Index of the header portion of the RTP payload indicates which bit rate in FIG. 19A is used. The Q bit is equivalent to the Q bit described in NPL 1.

Codec Mode Request is a field for requesting the communicating partner to change the codec mode (bit rate) and Frame Type Index in FIG. 20B is used. The encoder of the communicating partner that has received Codec Mode Request selects and encodes an optimum combination of the combinations of codecs that provide specified bit rates. For example, when the value of Frame Type Index indicated by Codec Mode Request is 1 (12 kbps), the frame contents may be a combination of Frame Type Index "0," "3" or "5" in FIG. 19A. However, when FIG. 20A only corresponds to a codec in scheme Y, there are two possibilities: Frame Type Index "3" (12 kbps in scheme Y) and "5" (basic part of 8 kbps and first expanded part of 4 kbps in scheme Y). The encoder performs encoding using the combination determined to be optimum among the possible combinations.

The R bit shown in FIG. 20B is a field indicating a request that cannot be requested from the other party by Codec Mode Request. For example, the R bit indicates a specification of the number of channels (e.g., mono="0," stereo="1") or a specification of delay (e.g., delay A="0" and delay B="1"). For example, to indicate both the number of channels and delay, the R bit may have 2 bits or more. This R bit may not necessarily exist in the header portion of the RTP payload when the delay or the number of channels is not changed during communication.

Furthermore, regarding the delay mode, the delay mode may also be included in the table of FIG. 20A and Frame Type Index may be assigned. For example, delay A is assigned regarding the bit rates assigned to Frame Type Indices "0" to "8." Furthermore, the value of Frame Type Index shown in FIG. 20A may be expanded to 31 and delay B may be assigned regarding the bit rates assigned to Frame Type Indices "11" to "19." (not shown) Furthermore, when the delay mode is not included in the table of FIG. 20A, a bit indicating the delay mode may be included in the header portion of the RTP payload for the encoding side (the own terminal side). Furthermore, the number of channels on the encoding side (the own terminal side) may also be included in the table of FIG. 20A (by expanding the value of Frame Type Index) as in the case of the delay mode. A bit indicating the specification of the number of channels may be included in the header portion of the RTP payload or may be included in the encoded data itself.

By specifying only the codec bit rate as shown in the second example, the encoding side can perform optimum encoding and reduce the number of bits of Frame Type Index and Codec Mode Request in the header portion of the RTP payload. Furthermore, by including Codec Mode Request in the header portion of the RTP payload, a codec mode (or codec mode set) change request can be speedily transmitted to the communicating partner. However, when the request for the communicating partner to speedily change the codec mode (or codec mode set) is not necessary and when Codec Mode Request and the R bit are necessary, these may not be included in the header portion of the RTP payload, but, may be included in RTCP and notified of to the partner. Furthermore, a plurality of frames (1-frame encoded data) may be simultaneously sent (in one IP packet). In this case, of a plurality of frames sent simultaneously, a bit for identifying which frame is the last frame may be included in the header portion of the RTP payload. Furthermore, the bits and fields included in the header portion of the RTP payload are not limited to those shown in this example.

FIG. 21 is a third example illustrating numbering (Frame Type Index) of a codec mode (the bit rate and type thereof in this example) and an RTP payload format in the present embodiment.

As shown in FIG. 21A, different Frame Type Indices are assigned to the basic parts of multirate codec and scalable codec, and the respective expanded parts of scalable codec.

FIG. 21B is an example of the RTP payload format in the third example.

In the third example, as shown in FIG. 21, a header portion of the RTP payload is added to each layer (basic part, first expanded part, second expanded part) in the scalable codec. In FIG. 21B, a C bit included in the header portion of the RTP payload indicates whether or not a subsequent expanded part exists. Thus, the basic part and each expanded part may be sent as separate IP packets. This provides an advantage that IP packets of the expanded part with low priority can be discarded when the network or wireless access period or the like is congested.

Codec Mode Request and a Q bit may be added to only the header portion of each RTP payload or header portion of the RTP payload of the basic part. The description of the delay mode and the method of requesting the communicating partner to change the codec mode (or codec mode set) are similar to those in the first example (FIG. 19) and the second example (FIG. 20). Furthermore, a plurality of frames may be sent simultaneously (in one IP packet). In this case, the header portion of the RTP payload may include a bit for identifying which of the plurality of frames simultaneously sent is the last one. Furthermore, the bits and fields included in the header portion of the RTP payload are not limited to those shown in this example.

An example has been provided in this example as shown in FIG. 21A, where a series of Frame Type Indices are given to respective bit rates or the types of bit rates in scheme X (e.g., multirate codec) and scheme Y (e.g., scalable codec). That is, an example has been described where scheme X and scheme Y can be treated as if they were an identical codec scheme. However, Frame Type Index and the payload format may also be given to scheme X and scheme Y separately and used independently.

An example has been described in the present embodiment where a Q bit is included, but the Q bit may be omissible.

(Embodiment 5)

The present embodiment relates to a preferable RTP payload format and a processing method thereof when the length of the RTP payload is limited to a plurality of fixed lengths and when there can be a plurality of combinations representing one bit rate (or bit rates therearound). This corresponds, for example, to a case with scheme Y described in Embodiment 4.

An example where the length of the RTP payload is limited to a plurality of fixed lengths is a case where a transmission block size is defined as in the case of a wireless period of a mobile phone network.

FIG. 22 is a first example illustrating numbering (Frame Type Index) of a codec mode and an RTP payload format in the present embodiment.

In the first example, numbering (association with Frame Type Index) is performed on a gross bit rate. Here, a gross bit rate is assumed to be an RTP payload length converted to the number of kilo bits per second (kbps: kilo bit per second). FIG. 22A shows an example of numbering on the gross bit rate.

Furthermore, in the first example, information or part of information included in the header portion of the RTP payload (e.g., Codec Mode Request field) may be selected by negotiation (SDP offer and answer) when a call starts. At this time, when a codec mode (or codec mode set) (range of bit rates used or delay mode or the like) is selected in Embodiments 1 and 3, information or part of information included in the header portion of the RTP payload may be selected in accordance with this selected codec mode (or codec mode set).

For example, when the low range of bit rates is used like "normal communication" described in FIGS. 9 and 15, a selection of not including the Codec Mode Request field in the header portion of, the RTP payload is made in order to suppress the proportion of the header portion of the RTP payload to a small level.

FIG. 22B shows an example of the RTP payload format when the Codec Mode Request field is decided not to be included in the header portion of the RTP payload beforehand through negotiation or policy of a service operator or the like when a call starts. Furthermore, FIG. 22C shows an example of the RTP payload format when the Codec Mode Request field is decided to be included in the header portion of the RTP payload beforehand through negotiation or policy of a service operator or the like when a call starts. In FIGS. 22B and 22C, a Q bit included in the header portion of the RTP payload is equivalent to the Q bit described in NPL 1 and is an indicator of frame quality.

The encoder side determines a bit rate corresponding to the length of the data portion of the RTP payload determined by Frame Type Index and the length of the header portion of the RTP payload, and a combination thereof, from among bit rates supported by the corresponding codec scheme and combinations thereof. Here, the length of the header portion of the RTP payload is determined beforehand by negotiation or policy of a service operator or the like when a call starts. The information indicating the combination determined by the encoder may be included in the encoded data. When the codec bit rate is not changed from the start to end of communication through policy of a service operator or the like, the header portion of the RTP payload need not include Frame Type Index. A certain bit rate in this case may be determined by negotiation when a call starts or may be determined beforehand by policy of a service operator or the like.

FIG. 23 shows an example of codec mode numbering (Frame Type Index) and an RTP payload format (referred to as a second example in the present embodiment) when the information included in the header portion of the RTP payload is determined beforehand. This is, namely, a case where the information included in the header portion of the RTP payload as in the first example (FIG. 22) of the present embodiment is not determined by negotiation when communication starts but the length of the header portion of the RTP payload is determined beforehand.

In this example, as shown in FIG. 23A, numbering (association with Frame Type Index) is performed on bit rates obtained by converting the length of the data portion of the RTP payload to the number of kilo bits per second (kbps: kilo bit per second). In this example, 1-frame encoded data per 20 milliseconds becomes an RTP packet. That is, 50 RTP packets per second are generated. Furthermore, the length of the header portion of the RTP payload is 5 bits when the gross bit rate shown in FIG. 22A is 7.2 kbps, 8 kbps or 9.6 kbps, and 8 bits when the gross bit rate is 13.2 kbps, 16.4 kbps or 24.4 kbps. The number of RTP packets per second, the length of the header portion of the payload, and the correspondence between the gross bit rate and the length of the header portion are not limited to these.

FIGS. 23B and 23C show examples of the RTP payload format when the Codec Mode Request field is included and when not included respectively. This example shows an example of a case where it is assumed that the Frame Type Index field which is information that can be included in the header portion of the RTP payload has 4 bits, the Q bit field has 1 bit and the Codec Mode Request field has 3 bits.

The Frame Type Index field contains corresponding Frame Type Index in FIG. 23A. The Q bit field is equivalent to the Q bit described in NPL 1. Furthermore, the Codec Mode Request field contains "0" to "5" (that is, only information necessary to request the communicating partner to change the bit rate) of Frame Type Index in FIG. 23A. Furthermore, the Codec Mode Request field may use "6" or "7" as a value indicating that there is no change in the bit rate with respect to the encoder of the communicating partner. Each field length of the header portion of the RTP payload of this example or the corresponding value need not be limited to this and the information (field) included in the header portion of the RTP payload in this example is not limited to this either.

In the first example (FIG. 22) and the second example (FIG. 23) of the present embodiment, the gross bit rate or the length of the data portion of the RTP payload corresponding to the gross bit rate only are specified as Frame Type Index. Thereby, the encoding side can perform optimum encoding in accordance with the length of the data portion of the RTP payload and reduce the number of bits of Frame Type Index in the header portion of the RTP payload.

Furthermore, the length of the header portion of the RTP payload is made adjustable. By so doing, it is possible to determine the length of the data portion of the RTP payload and perform suitable encoding in accordance with the range of bit rates determined by characteristics of the transmission path or the like (codec mode (or codec mode set) of Embodiments 1 to 3). When the Codec Mode Request field is not included in the header portion of the RTP payload and when it is necessary to notify the communicating partner side encoder of a change of the bit rate, the change is notified of using RTCP.

(Embodiment 6)

The present embodiment will describe a method of selecting a codec mode (or codec mode set) using policy of an operator providing each UE with a communication/call service.

Examples of the operator's policy include preferentially used codec (codec scheme), preferentially used codec bit rate, preferentially used sampling rate, preferentially used audio band (e.g., NB, WB, SWB, FB), preferentially used algorithmic delay and preferentially used number of channels. Furthermore, other examples of the operator's policy include whether or not to allow the bit rate or the number of channels to be changed in the middle of a session, whether or not to allow Source-Controlled Variable Bit Rate (VBR) operation (e.g., see "3GPP2 C.S0052-A Version 1.0 "'Source-Controlled Variable-Rate Multimode Wideband Speech Codec (VMR-WB)'""), whether or not to allow handover to a line switching network (e.g., see "3GPP TS23.216 v9.6.0 "Single Radio Voice Call Continuity (SRVCC); Stage 2""") and whether or not to allow a redundant frame as described in NPL 2.

Figure 2:
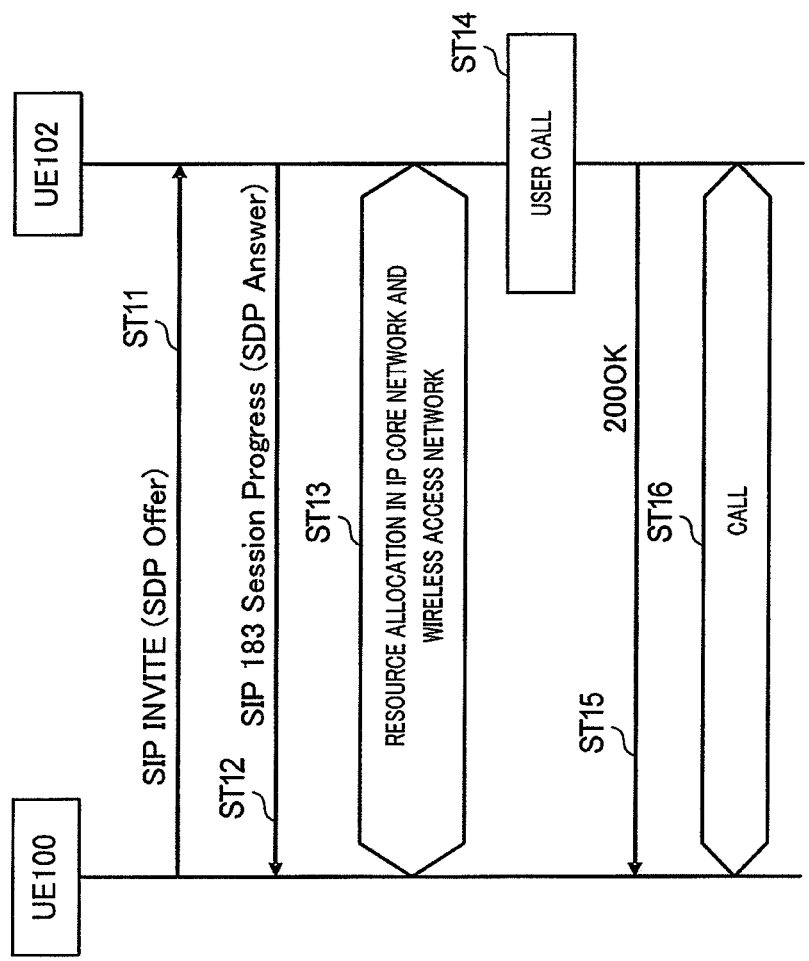
FIG. 2 is a diagram illustrating an example of basic operation of establishing a call session.

The UE acquires the whole or part of the operator's policy before a call starts, that is, before performing the processing in ST11 shown in FIG. 2 and generates an SDP offer based on the acquired policy.

As the method of acquiring (whole or part of) a policy, for example, a technique may be adopted which causes (whole or part of) the policy to be included in the signaling sent from the operator's network to the UE and acquires the policy from such signaling.

This signaling may be, for example, SIB (System Information Block, for example, see "3GPP TS 36.331 v10.0.0, "Evolved Universal Terrestrial Radio Access (E-UTRA) Radio Resource Control (RRC) Protocol specification'""). Furthermore, this signaling may be, for example, signaling when RRC (Radio Resource Control) connection is established (e.g., RRC Connection Setup described in "3GPP TS 36.331 v10.0.0, "Evolved Universal Terrestrial Radio Access (E-UTRA) Radio Resource Control (RRC) Protocol specification'"").

Furthermore, the policy may be sent together with SIP signaling of an IMS such as response message (2000K) to Register (e.g. see "3GPP TS 23.228 v10.3.1, "IP Multimedia Subsystem (IMS) Stage 2""). Furthermore, the policy may also be included in, for example, a P-CSCF search response message. When the policy is sent to the UE using a response message, a parameter indicating that there is a capability to receive the operator's policy using a response message may be added to the request message from the UE (e.g., RRC Connection Request described in "3GPP TS 36.331 v10.0.0, "Evolved Universal Terrestrial Radio Access (E-UTRA) Radio Resource Control (RRC) Protocol specification'"" or Register described in "3GPP TS 23.228 v10.3.1, "IP Multimedia Subsystem (IMS) Stage 2""").

Furthermore, as another method of acquiring a policy, the UE may also determine (whole or part of) the operator's policy from policy-related information locally held by the UE based on information sent from the operator's network to the UE. For example, the UE locally holds (whole or part of) a policy for each operator, acquires, when connected to a certain operator's network, information relating to the operator (operator information) and selects (whole or part of) the corresponding operator's policy from a locally held database. The operator information acquired when the UE is connected to the operator's network is acquired, for example, from Cell ID (e.g., see "3GPP TS 23.003 v10.0.0, "Numbering, addressing and identification (Release 10)"").

Furthermore, as a further method of acquiring a policy, the UE may select a codec bit rate preferentially used for a call based on QoS information (e.g., see "3GPP TS 23.401 v10.2.1, "Evolved Universal Terrestrial Radio Access Network (E-UTRAN) access (Release 10)"") allowed for a call for each user, sent when the UE is connected to the operator's network.

Next, an example of the method of generating an SDP based on a policy acquired from the operator will be shown.

FIG. 24 shows a policy of the operator (operator A) connected to the calling-side UE (FIG. 24A) and an example of SDP offer generation by the calling-side UE (FIG. 24B). Furthermore, FIG. 25 shows a policy of an operator (operator B) connected to the called-side UE (FIG. 25A) and an example of generating an SDP answer by the called-side UE (FIG. 25B). In FIGS. 24 and 25, defaults of each scheme described, for example, in NPL 2 are applied to items and values or the like not described in the policy or SDP. On the other hand, the methods of describing the policy and SDP shown in FIGS. 24 and 25 are examples, and other description methods may also be adopted.

For example, as shown in FIG. 24A, the policy of operator A includes a policy (hereinafter referred to as "policy A1") with "codec: scheme 1, audio band: SWB, bit rate: [12 kbps, 24 kbps] and VBR: enabled." Furthermore, the policy of operator A includes a policy (hereinafter referred to as "policy A2") with "codec: scheme 1, audio band: WB, bit rate: [12 kbps, 24 kbps] and VBR: enabled." Furthermore, the policy of operator A includes a policy (hereinafter referred to as "policy A3") with "codec: scheme 2, audio band: NB, bit rate: [8 kbps, 12 kbps] and VBR: disabled."

Thus, the calling-side UE creates an SDP offer including a candidate for the codec mode (or codec mode set) corresponding to at least part of the policy (here, the policy of operator A shown in FIG. 24A) of an operator providing a communication or call service to the calling-side UE.

For example, as shown in FIG. 24B, the calling-side UE selects a candidate for the codec mode set, which is part of policy A1 shown in FIG. 24A, corresponding to codec: scheme 1, audio band: SWB, bit rate: {12, 24} kbps. To be more specific, candidates for two codec mode sets (a=rtpmap: 97 and 98) are created which correspond to codec: scheme 1, audio band: SWB, bit rate: [12 kbps, 24 kbps] and VBR: Yes (enabled) or VBR: No (disabled) shown in FIG. 24B.

Similarly, as shown in FIG. 24B, the calling-side UE selects a candidate for the codec mode set, which is part of policy A2 shown in FIG. 24A, corresponding to codec: scheme 1, audio band: WB, bit rate: {12,24} kbps. To be more specific, candidates for two codec mode sets (a=rtpmap: 99 and 100) are created which correspond to codec: scheme 1, audio band: WB, bit rate: [12 kbps, 24 kbps] and VBR: Yes (enabled), or VBR: No (disabled) shown in FIG. 24B.

Similarly, as shown in FIG. 24B, the calling-side UE creates a candidate for the codec mode set (a=rtpmap: 101) corresponding to codec: scheme 2, audio band: NB, bit rate: [8 kbps, 12 kbps] and VBR: No (disabled) which is whole policy A3 shown in FIG. 24A.

As shown in FIG. 24B, candidates for a plurality of codec modes (or codec mode sets) included in an SDP offer notified of from the calling-side UE to the called-side UE include candidates for the codec mode (or codec mode set) corresponding to at least part of the policy of an operator providing a communication or call service to the calling-side UE.

On the other hand, as shown in FIG. 25A, the policy of operator B includes a policy (hereinafter referred to as "policy B1") with "codec: scheme 1, audio band: WB, bit rate: 12 kbps and VBR: No (VBR disabled)." Furthermore, the policy of operator B includes a policy (hereinafter referred to as "policy B2" with "codec: scheme 2, audio band: NB, bit rate: 12 kbps, and VBR: No (VBR disabled)."

Then, the called-side UE selects a codec mode set used to communicate with the calling-side UE from among candidates for the codec mode set corresponding to at least part of the policy of operator B shown in FIG. 25A from among candidates for the codec mode set included in the SDP offer shown in FIG. 24B notified of from the calling-side UE.

To be more specific, in FIG. 25B, the called-side UE selects a candidate (codec: scheme 1, audio band: WB, bit rate: 12 kbps, and, VBR: No (disabled)) for the codec mode set of whole policy B1 shown in FIG. 25A, as a codec mode set used to communicate with the calling-side UE.

The codec mode (or codec mode set) selection method in the present embodiment may be used together with the codec mode (or codec mode set) selection methods shown in Embodiments 1 to 3.

According to the present embodiment, this allows the calling-side UE to limit a codec mode (or codec mode set) or the like described in the SDP offer in accordance with the policy of the operator connected to the calling-side UE. Furthermore, the called-side UE can limit a codec mode (or codec mode set) or the like selected as a codec mode (or codec mode set) used to communicate with the calling-side UE in accordance with the policy of the operator connected to the called-side UE. This can prevent complicated SDP negotiation between the calling-side UE and the called-side UE. Furthermore, the operator can cause the UE to select a service (codec) based on the policy.

(Embodiment 7)

The present embodiment will describe a codec mode (or codec mode set) selection method using a network configuration example which is different from the network configurations used in Embodiments 1 to 3.

Figure 26:
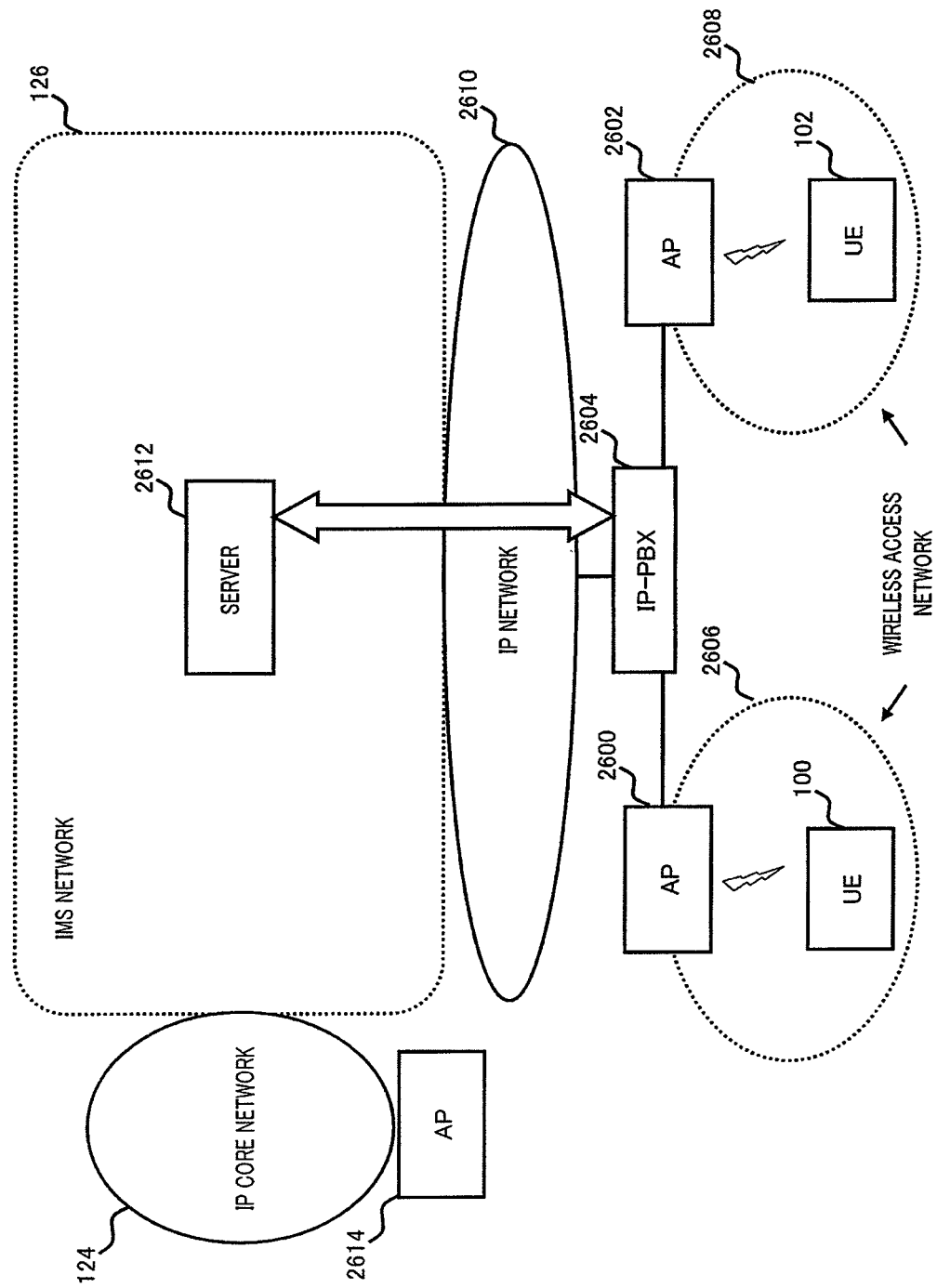
FIG. 26 is a diagram illustrating an example of network configurations according to Embodiment 7 of the present invention.

FIG. 26 is a diagram illustrating network configurations and an example of a positional relationship between UEs (terminals) according to the present embodiment. In FIG. 26, since UE 100, UE 102, IP core network 124 and IMS network 126 are identical to those in FIG. 1, these will be assigned identical reference numerals and descriptions thereof will be omitted.

AP 2600 and AP 2602 shown in FIG. 26 are access points, and constitute wireless access network 2606 and wireless access network 2608 respectively. For example, AP 2600 and 2602 may also be access points for Wi-Fi, WiMAX or the like, or may be the HeNBs shown in FIG. 1.

IP-PBX 2604 is connected to AP 2600 and AP 2602, and is an apparatus (network node having a processing function for call control) that implements an in-house telephone network using IP telephones in an LAN within an organization such as a company. For example, IP-PBX 2604 has a connection function with an operator's IMS network or part of the function of the operator's IMS network (e.g., see "3GPP TS 22.809 v1.0.0, Feasibility Study on Support for 3GPP Voice Interworking with Enterprise IP-PBX (VINE) """). Furthermore, IP-PBX 2604 is connected to server 2612 located within the operator's IMS network 126, via external IP network 2610 such as a broadband network of an Internet provider or the like. Furthermore, IP-PBX 2604 may also have a function (not shown) that terminates a gateway function or IMS signaling with external IP network 2610.

Figure 1:
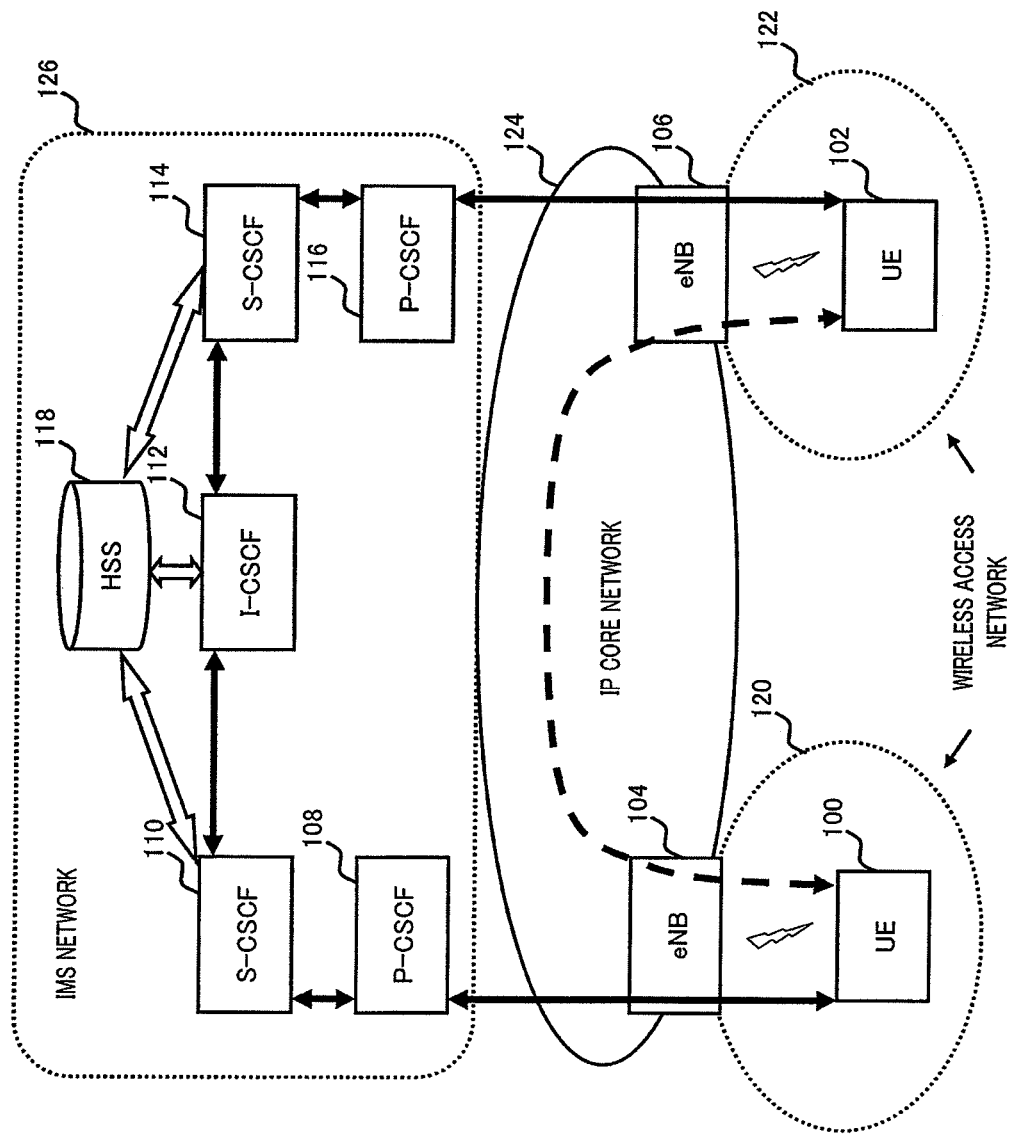
FIG. 1 is a diagram illustrating an example of configurations of an IMS network, an IP core network and a wireless access network.

Server 2612 may be a CSCF such as S-CSCF 100 shown in FIG. 1 or AS (Application Server, described in, e.g., "3GPP TS 23.228 v10.3.1, "IP Multimedia Subsystem (IMS) Stage 2") or both, or may be an apparatus that connects the CSCF or AS with IP-PBX 2604.

AP 2614 is an access point connected to IP core network 124. AP 2614 may also be a base station (eNB or HeNB). Furthermore, AP 2614 may also be an access point for Wi-Fi or WiMAX or the like (e.g., see "3GPP TS 23.402 v10.2.1, "Architecture enhancements for non-3GPP accesses"").

In FIG. 26, UE 100 is connected to AP 2600 within wireless access network 2606. At this time, suppose that, for example, connection destination determining section 604 of UE 100 (FIG. 7) determines that UE 100 is connected to a wireless access network (wireless access network 2606) that constitutes a LAN within an organization such as a company. When AP 2600 is an HeNB, connection destination determining section 604 may determine the connection destination using a CSG ID or the like as in the case of Embodiment 1. Furthermore, when AP 2600 is an access point of wireless LAN for Wi-Fi or the like, connection destination determining section 604 may determine the connection destination using an SSID (Service Set Identifier) or the like.

In the present embodiment, when UE 100 (calling side) makes a call to UE 102 (called side), UE 100 may select a codec mode (or codec mode set) described in an SDP offer according to a determination of connection destination determining section 604 (FIGS. 7, 13) as in the case of Embodiments 1 to 3. Furthermore, instead of UE 100 selecting the codec mode (or codec mode set), IP-PBX 2604 may select the codec mode (or codec mode set).

Figure 27:
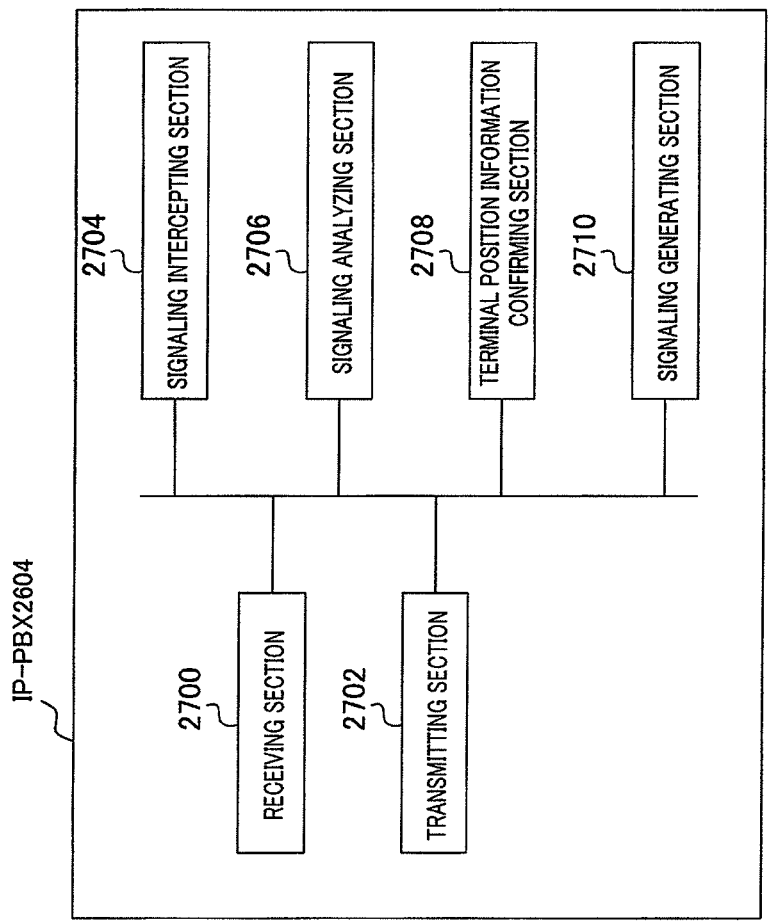
FIG. 27 is a block diagram illustrating an IP-PBX configuration according to Embodiment 7 of the present invention.

FIG. 27 is a block diagram illustrating a configuration of IP-PBX 2604 according to the present embodiment.

In IP-PBX 2604 shown in FIG. 27, upon receiving a signaling message from calling-side UE (here, UE 100), receiving section 2700 outputs the signaling message to signaling intercepting section 2704.

Transmitting section 2702 transmits the signaling message inputted from signaling generating section 2710 to a UE (called-side UE; UE 102 here) which is the destination of the signaling message.

Even if the signaling message inputted from receiving section 2700 is not addressed to its own terminal (IP address of IP-PBX 2604), signaling intercepting section 2704 temporarily intercepts the signaling message. Signaling intercepting section 2704 outputs the intercepted signaling message to signaling analyzing section 2706.

Signaling analyzing section 2706 analyzes information described in the inputted signaling message and outputs information requiring confirmation to an appropriate confirming section. For example, signaling analyzing section 2706 hands over call destination information of the information described in the signaling message to terminal position information confirming section 2708 to determine whether or not a wireless access network to which the called-side UE (UE 102) is currently connected is under the control of IP-PBX 2604.

Terminal position information confirming section 2708 confirms whether or not the wireless access network to which the called-side UE (UE 102) is currently connected is under the control of IP-PBX 2604 (e.g., whether or not UE 102 is connected to an identical in-house telephone network). This confirmation is made based on the call destination information received from signaling analyzing section 2706. At this time, terminal position information confirming section 2708 may make confirmation using registration information or the like of UE 102 in IP-PBX 2604 or make confirmation using all or part of registration information or the like of UE 102 located in IMS network 126 through server 2612. Alternatively, terminal position information confirming section 2708 may make confirmation using both pieces of the information. Terminal position information confirming section 2708 outputs the confirmation result to signaling generating section 2710.

Signaling generating section 2710 overwrites or newly creates description contents requiring correction of the signaling message transmitted from the calling-side UE (UE 100). For example, suppose that terminal position information confirming section 2708 determines that the called-side UE (UE 102) is located within an identical in-house telephone network (under the control of IP-PBX 2604 here). In this case, signaling generating section 2710 newly describes or overwrites the description contents of the SDP offer in the signaling message so as to include the codec mode (or codec mode set) or the like used for a call within the identical in-house telephone network. In this case, signaling generating section 2710 may add information indicating that IP-PBX 2604 has confirmed the SDP offer, to the signaling message using a description method such as a flag, numeric value and text.

Furthermore, suppose that terminal position information confirming section 2708 determines that the called-side UE (UE 102) is located, for example, outside the identical in-house telephone network (under the control of IP-PBX 2604 here). In this case, signaling generating section 2710 may also newly describe or overwrite the description contents of the SDP offer in the signaling message so as to include a codec mode (or codec mode set) or the like used for a normal call. In this case, signaling generating section 2710 may add information indicating that IP-PBX 2604 has confirmed the SDP offer, to the signaling message using a description method such as a flag, numeric value and text.

The newly created or corrected signaling message is transmitted to the destination of the signaling message (UE 102) via transmitting section 2702.

Suppose that the called-side UE (UE 102) that has received the signaling message determines that the connection destination (wireless access network) to which UE 102 is connected is a wireless access network that constitutes a LAN in an organization such as a company, and determines that the IP-PBX has confirmed the SDP offer in the received signaling message. In this case, the called-side UE (UE 102) refers to the SDP offer (SDP offer overwritten or newly created by IP-PBX 2604) and selects a codec mode (or codec mode set) or the like used for a call in the identical in-house telephone network. In this case, the called-side UE (UE 102) may select a codec mode (or codec mode set) using the presence or absence of a possibility of handover or the like as in the case of Embodiment 3.

On the other hand, suppose that the called-side UE (UE 102) has determined that the connection destination (wireless access network) to which UE 102 is connected is a wireless access network that constitutes a LAN in an organization such as a company, but has not successfully determined that the SDP offer in the received signaling message has been confirmed by the IP-PBX. In this case, the called-side UE (UE 102) may also select a codec mode (or codec mode set) or the like used for normal communication or a normal call from among codec mode (or codec mode set) candidates described in the SDP offer.

Furthermore, when the connection destination of the called-side UE (UE 102) is outside a wireless access network that constitutes a LAN in an organization such as a company, the called-side UE (UE 102) applies a codec mode (or codec mode set) selection method similar to those in Embodiments 1 to 3.

The called-side UE (UE 102) then generates an SDP answer including the selected codec mode (or codec mode set) and transmits the SDP answer to the calling-side UE (UE 100).

Thus, according to the present embodiment, when the wireless access network to which the called-side UE is currently connected is under the control of IP-PBX 2604, IP-PBX 2604 changes (newly creates or overwrites) a plurality of codec mode (or codec mode set) candidates shown in the SDP offer notified of from the calling-side UE and generates a new SDP offer. The called-side UE then selects a codec mode (or codec mode set) used to communicate with the calling-side UE from among the plurality of codec mode (or codec mode set) candidates included in the SDP offer changed in IP-PBX 2604.

Thus, when the wireless access network to which the called-side UE is currently connected is under the control of IP-PBX 2604, it is possible to limit candidates for the codec mode (or codec mode set) described in the SDP offer or the like to an appropriate codec mode (or codec mode set) (e.g., codec mode (or codec mode set) or the like used for a call within an identical in-house telephone network) for the UE under the control of IP-PBX 2604. This makes it possible to prevent complicated SDP negotiation between the calling-side UE and the called-side UE.

Furthermore, IP-PBX 2604 transmits information indicating whether or not an SDP offer is (has been) confirmed, to the called-side UE. Upon determining that IP-PBX 2604 has confirmed the SDP offer, the called-side UE selects a codec mode (or codec mode set) used to communicate with the calling-side UE from among a plurality of codec mode (or codec mode set) candidates included in the changed SDP offer changed in IP-PBX 2604.

This makes it possible to accurately determine whether or not the UE is located under the control of IP-PBX 2604 (identical in-house telephone network). When, for example, the UE is located under the control of IP-PBX 2604 (identical in-house telephone network), the UE can select a codec mode (or codec mode set) by limiting the codec mode to a codec mode (or codec mode set) used for a call within the identical in-house telephone network or the like. Furthermore, when, for example, the UE is not located under the control of IP-PBX 2604 (within the identical in-house telephone network), the UE may select a codec mode (or codec mode set) by limiting the codec mode to a codec mode (or codec mode set) used for normal communication (normal call) or the like.

By so doing, the present embodiment can accurately determine a UE located within an identical in-house telephone network and allows the UE to select a suitable codec mode (or codec mode set) or the like.

A case has been described in the present embodiment where IP-PBX 2604 performs new description or overwriting regarding an SDP offer from the calling-side UE. However, in the present embodiment, when UE 102 is located within an identical in-house telephone network (under the control of IP-PBX 2604 here), IP-PBX 2604 may also perform new description or overwriting regarding an SDP answer from the called-side UE as described above.

Furthermore, when UE 100, UE 102 and IP-PBX 2604 newly create or overwrite an SDP offer or SDP answer, an operator's policy may also be used as in the case of Embodiment 6.

(Embodiment 8)

The present embodiment will describe how to provide a field which need not be included in RTP payloads (header portion, or part of a data portion) of all RTP packets regarding the RTP payload format shown in Embodiments 4 and 5.

For example, there is a codec mode request field shown in Embodiments 4 and 5 or a field for requesting a communicating partner to switch between mono/stereo (specification of the number of channels) and switch a delay mode (delay specification) or the like. These may be included in an RTP payload (header portion or part of a data portion) only when a request is generated.

SID (Silence Insertion Descriptor), No Data and speech lost described in NPL 3 or NPL 4 may not be included in the RTP payload (header portion) as part of Frame Type Index described in FIGS. 19 to 23 or the like. In this case, only when a request is generated for sending SID, No Data, speech lost or the like, the request may be included in the RTP payload (the header portion or part of the data portion).

Figures 28A, 28B:
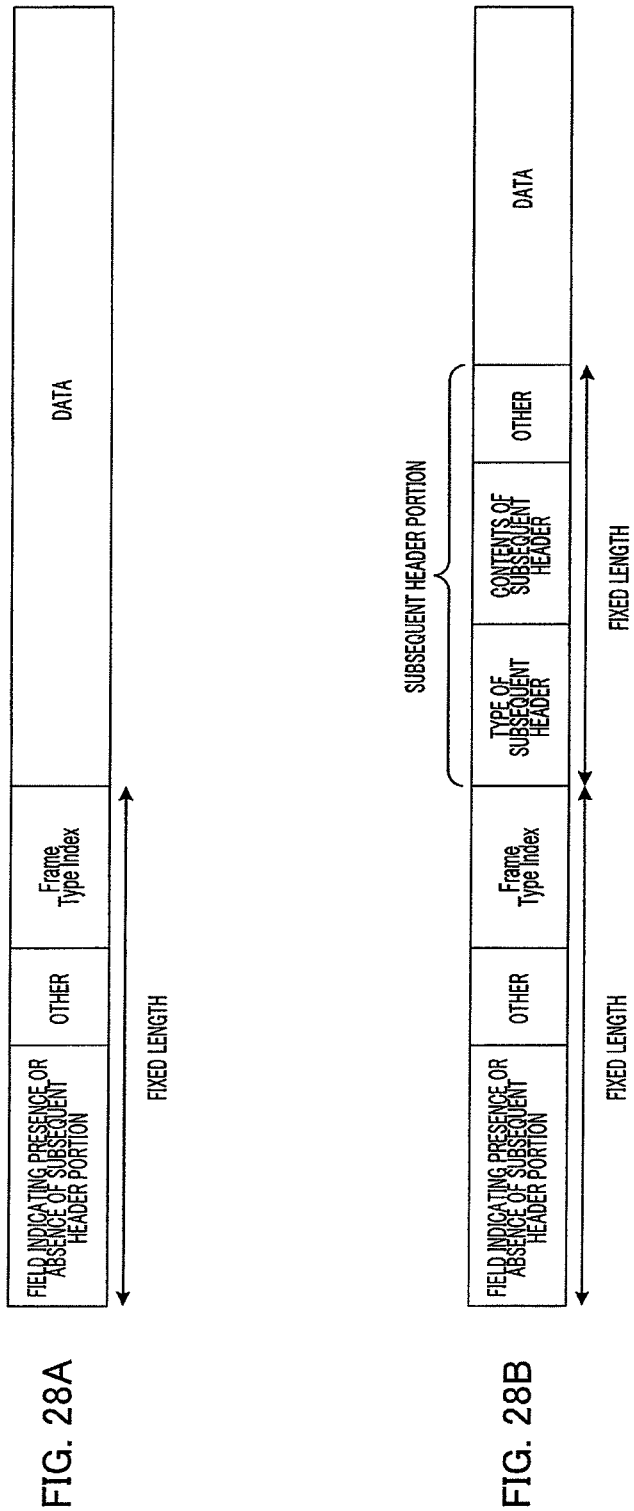
FIG. 28 (A and B) are diagrams illustrating a first example of an RTP payload format according to Embodiment 8 of the present invention.

FIG. 28 shows an example of an RTP payload format when Frame Type Index shown in FIG. 23A is used. Although the above-described SID is not included in Frame Type Index in FIG. 23A, suppose that, for example, an SID is set as Frame Type Index of 8 here. FIG. 28A shows an example of an RTP payload format when the above-described field (the Codec Mode Request field or a field for requesting the communicating partner to switch between mono/stereo, switch the delay mode or the like) does not exist. FIG. 28B shows an example of an RTP payload format when the above-described field exists.

Here, the header portion of the RTP payload shown in FIG. 28A has a fixed length of, for example, one octet. The header portion shown in FIG. 28A includes a "field indicating the presence or absence of a subsequent header portion" of a fixed length, "other" field and "Frame Type Index" or the like. Here, the "header portion" and "subsequent header portion" may be interpreted as part of the RTP payload data portion.

The "field indicating the presence or absence of a subsequent header portion" shown in FIG. 28A contains information indicating whether or not the header portion of a fixed length shown in FIG. 28A is followed by another fixed-length header portion in the form of, for example, a flag or numeric value. In FIG. 28A, since no other subsequent header portion exists, the "field indicating the presence or absence of subsequent header portion" contains information indicating the "absence" of any other subsequent header portion.

The "other" field shown in FIG. 28A contains any field other than both the "field indicating the presence or absence of a subsequent header portion" and "Frame Type Index."

"Frame Type Index" shown in FIG. 28A contains, for example, Frame Type Index shown in FIG. 23A.

The data portion of the RTP payload shown in FIG. 28A contains an appropriate bit rate and combination, and combination information or the like selected by the encoder as shown, for example, in Embodiment 5.

On the other hand, the "field indicating the presence or absence of a subsequent header portion" shown in FIG. 28B contains information indicating the "presence" of another fixed-length header portion (subsequent header) after the fixed-length header portion shown in FIG. 28B.

The "other" field and "Frame Type Index" shown in FIG. 28B are equivalent to those in FIG. 28A.

The subsequent header shown in FIG. 28B has a fixed length of, for example, one octet. The subsequent header shown in FIG. 28B contains the "type of a subsequent header," "contents of subsequent header" and "other" field.

The "type of subsequent header" shown in FIG. 28B shows information indicating what the subsequent header indicates in the form of, for example, a flag or numeric value. For example, the "type of subsequent header" may also show Codec Mode Request, request for switching the number of channels such as mono/stereo or request for switching the delay mode, and may also show redundant data for hiding packet loss.

The "contents of subsequent header" shown in FIG. 28B contains contents corresponding to the type shown in the "type of a subsequent header." For example, when the "type of subsequent header" is Codec Mode Request, a value indicating the codec bit rate to be requested from the communicating partner (e.g., Frame Type Index shown in FIG. 23A or the like) is contained. Furthermore, when the "type of subsequent header" is a request for switching the number of channels of mono/stereo or the like or request for switching the delay mode or the like, information on the requested switching destination (e.g., information indicating switching to "mono" or information indicating switching to "delay A" or the like) is contained. Furthermore, when the "type of subsequent header" is redundant data, the data length of the redundant data or the like is contained.

When the above-described "contents of subsequent header" can be uniquely determined by the "type of subsequent header" shown in FIG. 28B, the subsequent header may be omissible. Furthermore, although the field of "type of subsequent header" shown in FIG. 28B has a fixed length, the "field length of "contents of subsequent header" may have a value that differs depending on the "type of a subsequent header."

The "other" field shown in FIG. 28B contains fields other than both "type of subsequent header" and "contents of a subsequent header," but this field may be omissible if not necessary.

The data portion of the RTP payload shown in FIG. 28B contains an appropriate bit rate and combination, and combination information or the like selected by the encoder as shown, for example, in Embodiment 5. Furthermore, when the "type of subsequent header" is a redundant packet, the data portion also contains the redundant packet. In this case, the encoder selects appropriate bit rates and a combination thereof that fit into the length resulting from subtracting the length of the redundant packet from the length of the data portion as principal data, and generates a bit stream.

Thus, in the first example of the present embodiment, in the RTP payload made up of a header portion and a data portion, the header portion includes a header portion which is always provided in all RTP payloads and a header portion (subsequent header portion shown in FIG. 28B) which is not always provided in all RTP payloads. Furthermore, as shown in FIG. 28A and FIG. 28B, the header portion which is always provided in all RTP payloads includes a field indicating whether or not a subsequent header portion is provided (field indicating the presence or absence of a subsequent header portion).

The RTP payload format in the present embodiment may adopt a different configuration.

FIG. 29 shows a second example of the RTP payload format in the present embodiment. In this example, assuming that all information that needs to be carried by an RTP payload in particular is carried as part of the data portion of the RTP payload, information of other than encoded data is called "signaling (or signaling portion)." Furthermore, in this example, it is assumed that information indicating the bit rate of codec (Frame Type Index or the like) is not explicitly included in the RTP payload.

FIG. 29A shows an example of the RTP payload format when only the field indicating the presence or absence of a subsequent signaling portion exists as the signaling portion. FIG. 29B shows an example of the RTP payload format when the field indicating the presence or absence of a subsequent signaling portion and the subsequent signaling portion exist.

Here, the fixed length (e.g., 1 bit or the like) from the most significant bit of the RTP payload shown in FIG. 29A includes a "field indicating the presence or absence of a subsequent signaling portion." Here, the "fixed length from the most significant bit" and subsequent signaling portion" may be part of the above-described RTP payload data portion or may be the header portion of the RTP payload.

The "field indicating the presence or absence of a subsequent signaling portion" shown in FIG. 29A contains information indicating whether or not this field is followed by another signaling portion in the form of, for example, a flag or numeric value. For example, when this field has 1 bit, "0" in this field indicates that the subsequent signaling is not present and "1" in this field indicates that the subsequent signaling portion is present.

In FIG. 29A, since there is no other subsequent signaling portion, the "field indicating the presence or absence of a subsequent signaling portion" contains information indicating the "absence" of the other subsequent signaling portion (that is, "0" in this example).

On the other hand, the "field indicating the presence or absence of a subsequent signaling portion" shown in FIG. 29B contains information indicating the "presence" of another signaling portion (subsequent signaling) having a fixed length or variable length after the signaling portion having a fixed length shown in FIG. 29B (that is, "1" in this example).

The subsequent signaling portion shown in FIG. 29B has a fixed length or variable length and contains "type of subsequent signaling" and "contents of subsequent signaling" fields.

The "type of subsequent signaling" shown in FIG. 29B shows information indicating what the subsequent signaling indicates in the form of, for example, a flag or numeric value. For example, the "type of subsequent signaling" may also indicate Codec Mode Request (request for switching a codec bit rate, request for switching the number of channels, request for switching the bandwidth or the like) or may indicate the presence of redundant data for hiding packet loss. Furthermore, the "type of subsequent signaling" may also indicate SID, No Data and speech lost described in FIGS. 19 to 23 or the like.

The "contents of subsequent signaling" shown in FIG. 29B contains contents corresponding to the type shown in the "type of subsequent signaling." For example, when the "type of subsequent signaling" is a request for switching the codec bit rate of Codec Mode Request, this field contains a value indicating the codec bit rate to be requested from the communicating partner (e.g., Frame Type Index shown in FIG. 23A or the like). Furthermore, when the "type of subsequent signaling" is a request for switching the number of channels of Codec Mode Request, the "contents of subsequent signaling" contains information on the requested switching destination (e.g., information indicating switching to "mono", information indicating switching to "stereo" or the like). Furthermore, when the "type of subsequent signaling" is the presence of redundant data, the "contents of subsequent signaling" contains a data length of redundant data or the like. When the "contents of subsequent signaling" has a variable length, the length thereof varies depending on the type indicated in the "type of subsequent signaling."

When the above-described "contents of subsequent signaling" can be uniquely determined by the "type of subsequent signaling" shown in FIG. 29B or when the "contents of subsequent signaling" need not be determined, the "contents of subsequent signaling" may be omissible. For example, this applies to a case where the "type of subsequent signaling" indicates SID, No Data or speech lost described in FIGS. 19 to 23 or the like. Furthermore, while the "type of subsequent signaling" field shown in FIG. 29B has a fixed length, the length of the "contents of subsequent signaling" field may have a value differing depending on the "type of subsequent signaling." When the "contents of subsequent signaling" has a value differing depending on the "type of subsequent signaling," subsequent signaling itself has a variable length.

Furthermore, the RTP payload format in FIG. 29B may also be provided with a "field indicating the presence or absence of a subsequent signaling portion" after the "type of subsequent signaling" and "contents of subsequent signaling." The RTP payload format may further include additional "type of subsequent signaling," "contents of subsequent signaling" and "field indicating the presence or absence of a subsequent signaling portion" (not shown).

The data portion of the RTP payload shown in FIG. 29B may contain an appropriate bit rate and combination, and combination information or the like selected by the encoder as shown, for example, in Embodiment 5. Furthermore, when the "type of subsequent signaling" is a redundant packet, a redundant packet may also be contained. In this case, the encoder selects appropriate bit rates and a combination thereof that fit into the length resulting from subtracting the length of the redundant packet from the length of the data portion as principal data, and generates a bit stream. Furthermore, when the "type of subsequent signaling" is an SID, the data portion of the RTP payload contains data generated in the case of the SID. On the other hand, when the "type of subsequent signaling" is No Data or speech lost described in FIG. 19 to FIG. 23 or the like, the data portion of the RTP payload does not contain data (data portion itself may not be present).

This example assumes that the information indicating the bit rate of codec (Frame Type Index or the like) is not explicitly contained in the RTP payload. In this case, the receiving side calculates the RTP payload length (calculates the RTP payload length from the data length information included in the IP header or UDP header or measures the RTP payload length itself), removes the length of the signaling portion in FIG. 29 and thereby calculates the codec bit rate.

Furthermore, an example has been shown in the example in FIG. 29 where the "field indicating the presence or absence of a subsequent signaling portion" is contained at the beginning of the RTP payload as a fixed length from the most significant bit, but this field may be contained in any position of the RTP payload (e.g., at the end of the RTP payload). In this case, the "field indicating the presence or absence of a subsequent signaling portion" does not mean that it "indicates the presence or absence of a subsequent signaling portion" but means that it "indicates whether or not the signaling portion is at the beginning of the RTP payload."

Thus, in the second example of the present embodiment, the RTP payload is made up of the data portion and the signaling portion included therein. In such an RTP payload, the signaling portion includes the "field indicating the presence or absence of a subsequent signaling portion" which is always provided in all RTP payloads and the signaling portion (subsequent signaling shown in FIG. 29B) which is not always provided in all RTP payloads.

FIG. 30 shows a third example of the RTP payload format of the present embodiment. In this example, a field indicating the presence or absence of a header portion is provided in the fixed length from the most significant bit of the RTP payload to thereby switch the presence or absence of the header portion in the RTP payload. In this way, when a field (signaling) is generated which needs not be included in the RTP payload of all RTP packets, the header portion of the RTP payload is used to include information (signaling) in this header portion.

FIG. 30A shows an example of the RTP payload format when only the field indicating the presence or absence of a header portion exists as the signaling portion. FIG. 30B shows an example of the RTP payload format when the header portion is present.

Here, the "field indicating the presence or absence of a header portion" is included in the fixed length (e.g., 1 bit or the like) from the most significant bit of the RTP payload shown in FIG. 30A. The "field indicating the presence or absence of a header portion" shown in FIG. 30A contains information indicating the presence or absence of the header portion in the RTP payload in the form of, for example, a flag or numeric value. For example, when this field has 1 bit, "0" in this field indicates that the header portion is not present and "1" in this field indicates that the header portion is present.

Since the header portion is not present in FIG. 30A, the "field indicating the presence or absence of a header portion" contains information indicating that the header is not present (that is, "0" in this example). As shown in FIG. 30A, when the "field indicating the presence or absence of a header portion" indicates that the header is not present, suppose that this "field indicating the presence or absence of a header portion" is part of the data portion of the RTP payload.

On the other hand, the "field indicating the presence or absence of a header portion" shown in FIG. 30B contains information indicating that the header portion shown in FIG. 30B is "present" (that is, "1" in this example). When the header portion is present, as shown in FIGS. 30B, 30C and 30D, the header portion is made up of the "basic header" and the "extension header." When the header portion is present, the basic header is always present, but the extension header may not be present depending on the contents of the information of the basic header.

FIG. 30C shows an example of the basic header. This example shows an example where when the header portion is present, the "field indicating the presence or absence of a header portion" is included as part of the basic header, but this field may be part of the data portion instead of being part of the header portion. That is, the "field indicating the presence or absence of a header portion" may not necessarily be included in the basic header. The basic header has a fixed length, and the remainder of the basic header contains, for example, a "mono/multi" field, "Frame Type" field and a field indicating the "presence or absence of a subsequent header."

The "mono/multi" field contains, for example, information indicating that the data being carried by this RTP payload is mono (1 channel) or multichannel such as stereo in the form of, for example, a flag or numeric value. For example, when this field has 1 bit, "0" in this field indicates mono and "1" in this field indicates multichannel.

When, for example, the aforementioned "mono/multi" field indicates mono, the "Frame Type" field contains information of the codec bit rate as shown in Frame Type Index described in FIGS. 19 to 23 or the like and information such as aforementioned SID (Silence Insertion Descriptor) or No Data. Furthermore, when the above-described "mono/multi" field indicates multichannel, "Frame Type" contains information of multichannel, bit rate or the like. The information of multichannel is information indicating the number of channels or multichannel encoding scheme (e.g., in the case of 2 channels, whether it is a scheme in which the right and left channels are encoded separately or a scheme in which a 2 channel expanded part is added or the like).

The "presence or absence of subsequent header" field contains information indicating whether or not an extension header is present, for example, after the basic header in the form of, for example, a flag or numeric value. For example, when this field has 1 bit, "0" in this field indicates that no subsequent header is present and "1" in this field indicates that a subsequent header is present.

Though the basic header has a fixed length, the value of the fixed length may vary depending on contents indicated by the "mono/multi" field, that is, depending on whether the channel is mono or multichannel.

FIG. 30D shows an example of the extension header when a subsequent header is present. The extension header has a fixed length and contains, for example, a "header type" field, "information" field, and a "presence or absence of subsequent header" field.

The "header type" field contains information indicating the type of this extension header in the form of, for example, a flag or numeric value. For example, when this field has 3 bits, for example, "000" in this field indicates that the type of the extension header is "redundant data information." The "header type" field containing "001" indicates that the type of the extension header is "Codec Mode Request (bitrate)." The "header type" field containing "010" indicates that the type of the extension header is "Codec Mode Request (number of channels)." The "header type" field containing "011" indicates that the type of the extension header is "Codec Mode Request (band)."

The "information" field contains different pieces of information depending on the contents of the "header type." For example, as described above, when the "header type" is "redundant data information," for example, the "information" field contains Frame Type Index indicating the bit rate of the redundant data. As described in NPL 2, this is a case where one RTP packet contains data of a plurality of frames. Furthermore, for example, as described above, when the "header type" is "Codec Mode Request (bitrate)," the "information" field contains Frame Type Index indicating the codec bit rate to be requested from the partner terminal. Furthermore, for example, as described above, when the "header type" is "Codec Mode Request (number of channels)," the "information" field contains the number of channels to be requested from the partner terminal or a multichannel encoding scheme. Furthermore, for example, as described above, when the "header type" is "Codec Mode Request (band)," the "information" field contains information indicating an encoding band to be requested from the partner terminal.

Furthermore, for example, the field indicating the multichannel and the information of the multichannel may be contained in the extension header instead of the basic header. Conversely, the fields indicating "Codec Mode Request" and the redundant data, and information thereof may be contained in the basic header instead of the extension header.

The "presence or absence of subsequent header" field further contains information as to whether or not an additional extension header is present, for example, after this extension header in the form of a flag or numeric value or the like. For example, when this field has 1 bit, "0" in this field indicates that the subsequent header is not present and "1" in this field indicates that the subsequent header is present.

Though the extension header has a fixed length, the value of the fixed length may differ depending on the contents indicated by the "header type" field.

When the header type of the extension header is, for example, "redundant data information" or "multichannel information," the data portion of the RTP payload shown in FIG. 30B also contains redundant data, the number of channels, and multichannel data conforming to the multichannel encoding scheme. Furthermore, when Frame Type of the basic header is, for example, No Data or speech lost described in FIG. 19 to FIG. 23, the data portion of the RTP payload may be omissible.

Furthermore, the example in FIG. 30 has shown a case where the "field indicating the presence or absence of a header portion" is contained at the beginning of the RTP payload as the fixed length from the most significant bit, but this field may be contained at any position of the RTP payload (e.g., at the end of the RTP payload).

Thus, the third example of the present embodiment includes a case where the header portion is not present (FIG. 30A) and a case where the header portion is present (FIG. 30B) in the RTP payload made up of the header portion and the data portion. Furthermore, as shown in FIGS. 30A and 30B, a field (field indicating the presence or absence of a header portion) is included which indicates whether or not the header portion is always provided in all RTP payloads.

As described in Embodiment 5, since the transmission block size or the like is determined, the RTP payload length, and the length of an RTP payload that carries data such as normal speech in particular may be limited to a plurality of fixed lengths. In such a case, like the present embodiment, if Codec Mode Request is included in the RTP payload that carries data such as normal speech, the RTP payload length may be greater than the corresponding transmission block size.

To solve this problem, at timing of sending an RTP payload whose data portion is not present or an RTP payload whose data portion is shorter than when normal data is sent, the terminal may send Codec Mode Request included in these RTP payloads. The case where the data portion is not present or the case where the data portion is shorter than when normal data is sent refers to, for example, a case where SID, No Data or speech lost described in FIGS. 19 to 23 is used.

Thus, according to the present embodiment, it is possible to give a necessary field to the RTP payload only when necessary and cause the encoder to select appropriate bit rates and a combination thereof that fit into the length of the data portion.

The embodiments of the present invention have been described so far.

Frame Type Index need not describe all codec modes provided (bit rates themselves or a combination of bit rates), and only some codec modes may be defined.

Furthermore, a case has been described in the above embodiments where the correspondence between an actual codec mode (or codec mode set) and a number (numeric value) indicating the codec mode (or codec mode set) is defined. Also a case has been described where the number (numeric value) indicating the codec mode (or codec mode set) is described in the SDP (FIGS. 8 and 11). However, the actual codec mode (or codec mode set) may also be directly described in the SDP.

Furthermore, "scheme 1" described in FIGS. 8, 11, 14 and 17 represents the name of specific codec. For example, "scheme 1" may be EVS, AMR or AMR-WB, or may also be other codecs. Furthermore, FIGS. 8 and 14 show descriptions in which only the codec of scheme 1 is offered, but other schemes (scheme 2, scheme 3 . . . ) may also be described likewise and may be included in the SDP offer.

Different types in a certain codec and the number of channels (mono, stereo or the like) may be described in the SDP as the codec name or may be defined in the correspondence of the codec mode set shown in FIGS. 9 and 15. Here, examples of the different types in the codec include AMR-WB inter-operable mode or AMR-WB non-inter-operable mode in EVS, and audio band (Narrow Band, Wide Band, Super Wide Band, Full Band).

Furthermore, a case has been described in the above embodiments where a CSG ID or base station ID is used as information relating to characteristics of a wireless access network. However, the information relating to characteristics of the wireless access network is not limited to this, and examples thereof include cell information indicating a cell (HeNB) to which a UE is connected and position information indicating the position of the UE.

Furthermore, a case has been described in the above embodiments where a codec mode (or codec mode set) (including a bit rate and algorithmic delay) is selected when communication between UEs starts, but the present invention is not limited to this. The above embodiments are also applicable to, for example, a case where the capability of the UE (e.g., size of the display) is selected.

Furthermore, the above embodiments have been described using a codec mainly relating to speech. However, the present invention is not limited to this, but is also applicable to music, acoustic, image or the like.

Furthermore, the present invention is not limited to the above embodiments, but can be implemented using various modifications.

In the foregoing embodiments, the present invention is configured with hardware by way of example, but the invention may also be provided by software in cooperation with hardware.

Furthermore, each function block employed in the description of each of the aforementioned embodiments may typically be implemented as an LSI constituted by an integrated circuit. These may be individual chips or partially or totally contained on a single chip. The term "LSI" is adopted herein but this may also be referred to as "IC," "system LSI," "super LSI," or "ultra LSI" depending on the differing extents of integration.

Further, the method of implementing integrated circuit is not limited to LSI, and implementation by way of dedicated circuitry or a general-purpose processor may also be possible. After LSI manufacture, utilization of a field programmable gate array (FPGA) or a reconfigurable processor where connections and settings of circuit cells within an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2010-252113, filed on Nov. 10, 2010, Japanese Patent Application No. 2010-278222, filed on Dec. 14, 2010, Japanese Patent Application No. 2011-84442, filed on Apr. 6, 2011, and Japanese Patent Application No. 2011-173910, filed on Aug. 9, 2011, including the specifications, drawings and abstracts are incorporated herein by reference in their entirety.

INDUSTRIAL APPLICABILITY

The present invention is particularly suitable for use in a terminal or the like which performs negotiation using signaling message when communication starts.

REFERENCE SIGNS LIST 100, 102 UE
104, 106 eNB
108, 116 P-CSCF
110, 114 S-CSCF
112 I-CSCF
118 HSS
120, 122, 406, 408, 506, 508, 2606, 2608 wireless access network
124 IP core network
126 IMS network
400, 402, 500, 502 HeNB
404 local GW
600 wireless receiving section
602 wireless transmitting section
604 connection destination determining section
606 information comparing section
608 mode determining section
610, 708, 2710 signaling generating section
700, 2700 receiving section
702, 2702 transmitting section
704, 2706 signaling analyzing section
706, 2708 terminal position information confirming section
812 status analyzing section
814 mode changing section
2600, 2602, 2614 AP
2604 IP-PBX
2610 IP network
2612 server
2704 signaling intercepting section

We claim:

1. A communication terminal, comprising:
a processor, and
a transmitter,
wherein the processor executes instructions to
select a codec mode or a codec mode set for the communication terminal, based on Session Description Protocol (SDP) offer/answer messages between the communication terminal and a partner terminal in a codec negotiation session when communication starts between the communication terminal and the partner terminal, the SDP offer/answer messages including a codec, and a codec mode or a codec mode set;
in a communication session after the codec negotiation session, generate a codec mode request (CMR) for requesting the partner terminal to change the codec mode; and
cause the transmitter to transmit, in a communication session with the partner terminal, a codec mode of the communication terminal currently in use, using an RTP (Real-time Transport Protocol) payload header,
wherein the RTP payload header includes multiple bits for the CMR field, the CMR field is only present when the code mode or the codec mode set of the partner terminal needs to be changed.

2. The communication terminal according to claim 1, wherein the processor generates the CMR for requesting the partner terminal to change the codec mode when the codec mode or the codec mode set of the partner terminal needs to be changed.

3. The communication terminal according to claim 1, wherein the codec mode includes a bit rate.

4. The communication terminal according to claim 1, wherein the CMR field is transmitted by the RTP payload header with or without data in the data portion.

5. The communication terminal according to claim 1, wherein, when the RTP payload format header is configured not to include the CMR field in the codec negotiation session, the CMR field is transmitted by RTP Control Protocol (RTCP).

6. The communication terminal according to claim 1, wherein a frame type index of the RTP payload format header specifies bit rate information, and the frame type index does not specify which codec or which combination of codecs is used.

7. A communication method, comprising:
selecting a codec mode or a codec mode set, by a processor, for a communication terminal, based on Session Description Protocol (SDP) offer/answer messages between a communication terminal and a partner terminal in a codec negotiation session when communication starts between the communication terminal and the partner terminal, the SDP offer/answer messages including a codec, and a codec mode or a codec mode set;

in a communication session after the codec negotiation session, generating a codec mode request (CMR) for requesting the partner terminal to change the codec mode; and transmitting, by a transmitter, in a communication session with the partner terminal, a codec mode of the communication terminal currently in use, using an RTP (Real-time Transport Protocol) payload header wherein the RTP payload header includes multiple bits for the CMR field, the CMR field is only present when the code mode or the codec mode set of the partner terminal needs to be changed.

8. The communication method according to claim 7, wherein the CMR for requesting the partner terminal to change the codec mode is generated when the codec mode or the codec mode set of the partner terminal needs to be changed.

9. The communication method according to claim 7, wherein the CMR field is transmitted by the RTP payload header with or without data in the data portion.

10. The communication method according to claim 7, wherein, when the RTP payload format header is configured not to include the CMR field in the codec negotiation session, the CMR field is transmitted by RTP Control Protocol (RTCP).

11. The communication method according to claim 7, wherein a frame type index of the RTP payload format header specifies bit rate information, and the frame type index does not specify which codec or which combination of codecs is used.

\* \* \* \* \*